(12) United States Patent
Kosugi

(10) Patent No.: US 6,262,861 B1
(45) Date of Patent: Jul. 17, 2001

(54) METHOD OF DETECTING POSITION ON DISK, DISK UNIT AND DISK

(75) Inventor: Tatsuhiko Kosugi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/044,463

(22) Filed: Mar. 19, 1998

(30) Foreign Application Priority Data

May 20, 1997 (JP) .................................................. 9-129762

(51) Int. Cl.[7] .................................................. G11B 5/596
(52) U.S. Cl. .................................... 360/78.14; 360/78.04
(58) Field of Search .......................... 360/77.02, 77.08, 360/78.04, 78.14, 75, 48

(56) References Cited

U.S. PATENT DOCUMENTS

| | | | |
|---|---|---|---|
| 5,255,131 | 10/1993 | Coker et al. | 360/48 |
| 5,343,340 | 8/1994 | Boutaghou et al. | 360/77.08 |
| 5,612,833 | 3/1997 | Yarmchuk et al. | 360/75 |

FOREIGN PATENT DOCUMENTS

| | | |
|---|---|---|
| 3529435 | 2/1987 | (DE) . |
| 4438395 | 10/1995 | (DE) . |
| 60-131680 | 7/1985 | (JP) . |
| 62-71020 | 4/1987 | (JP) . |
| 4-157678 | 5/1992 | (JP) . |

*Primary Examiner*—Andrew L. Sniezek
(74) *Attorney, Agent, or Firm*—Greer, Burns & Crain, Ltd.

(57) ABSTRACT

A method of detecting a position on a disk is applied to a disk which is time-divisionally recorded with a data region and a servo region based on a signal read from the disk, where the servo region is recorded with a servo pattern having a length of consecutive "0"s longer than a length of consecutive "0"s existing in the data region, and the servo pattern has three or more zones with consecutive "0"s. The method includes the steps of (a) digitizing the signal read from the disk and slicing at a predetermined level so as to convert the signal into "0" or "1", and (b) detecting the servo pattern when two zones with consecutive "0"s are detected from information converted by the step (a).

4 Claims, 37 Drawing Sheets

FIG. 3

| R/WRR | SMK | GAP | POS | GAP | GCR | GAP |
|---|---|---|---|---|---|---|
| 75*4T=300T | 3*14T=42T | 1*10T=10T | 39*8T=312T | 2*10T=20T | 286T | 2*10T=20T |
| 3.00 μs | 0.42 μs | 0.10 μs | 3.12 μs | 0.20 μs | 2.86 μs | 0.20 μs |

TOTAL OF 990T

GRAY CODE FRAME

| GMK | CAI | HAI | SSAI | PB | DB |
|---|---|---|---|---|---|
| 1*14T=14T | 7*10T+ 7*10T=140T | 5*8T=40T | 1*8T+ 6*8T=56T | 1*8T=8T | 2*10T+ 1*8T=28T |
| 0.14 μs | 1.40 μs | 0.40 μs | 0.56 μs | 0.08 μs | 0.28 μs |

F I G. 10
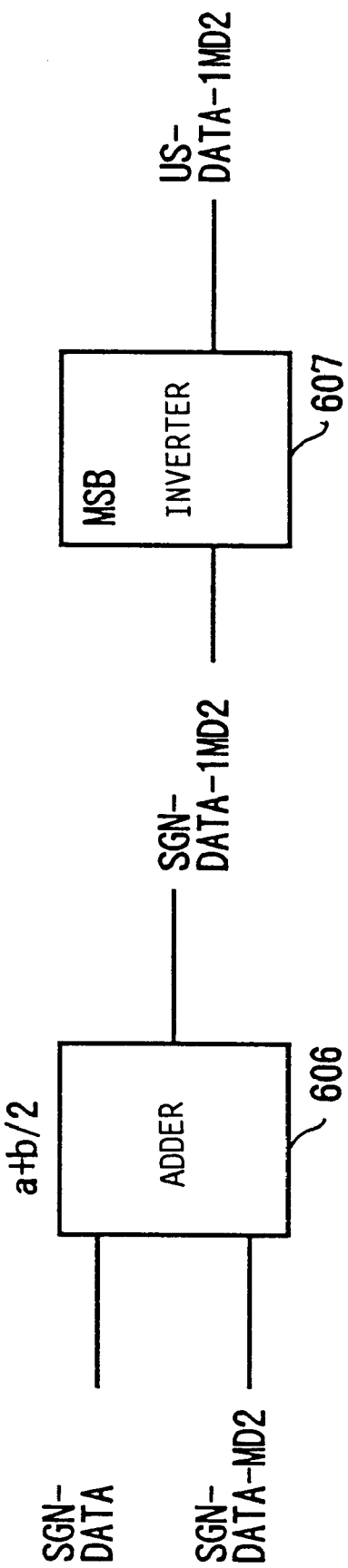

SERVO MARK

... MARK DETECTION

FIG. 18

111111111000000000000000001100000000000000001111111111
*123456789                *123456789
                           *           ... MARK DETECTION

FIG. 19

111111111000000000000110000111100000000001111111111
*123456789                    *123456789
                              *           ... MARK DETECTION

FIG. 26A  8-PERIOD INTEGRATION
FIG. 26B  2-PERIOD INTEGRATION

FIG. 30

```
                                          G13                      G12
CLOCK       0101010101010101010101010101  01010101010101010101  01010101010101010101
GRAY-START  0000000000000110000000000000  00000000000000000000  00000000000000000000
GRAY-RUN    0000000000000000011111111111  11111111111111111111  11111111111111111111
HI-DATA     0000000000000000000000001111  00000000000000001111  00000000000000001111
or DATA-EDGE
DT-SMPL     0000000000000000000000000000  00000000110000000000  00000000110000000000
REP-LOAD    0000000000000001100000000000  00000000000000000000  00000000000000000000
TRG-LD-BST  0000000000000001100000000000  00000000000000000000  00000000000000000000
TRG-LD-REL  0000000000000000000000000000  00000000110000000000  00000000110000000000
BURST-CTR   0112233445566778899AABBCCDDEEE000  01122334455667788000  01122334455667788000
TRG-CTR     XXXXXXXXXXXXXXXX000000000000  01111111100000000000  01111111100000000000
            XXXXXXXXXXXXXXXX8899AABBCCDDEEF  F00112233AABBCCDDEEF  F00112233AABBCCDDEEF
REP-CTR     XXXXXXXXXXXXXXXX8888888888888888  88888888899999999999  999999999AAAAAAAAAA
SEQ-CTR     XXXXXXXXXXXXXXX0000000000000000  00000000000000000000  00000000000000000000
TRG-MAX     XXXXXXXXXXXXXXX1111111111111111  11111111111111111111  11111111111111111111
            XXXXXXXXXXXXXXXX3333333333333333  33333333333333333333  33333333333333333333
TRG-REL     XXXXXXXXXXXXXXXX0000000000000000  00000000000000000000  00000000000000000000
            XXXXXXXXXXXXXXXXAAAAAAAAAAAAAAAA  AAAAAAAAAAAAAAAAAAAA  AAAAAAAAAAAAAAAAAAAA
REP-REL     XXXXXXXXXXXXXXXX8888888888888888  88888888888888888888  88888888888888888888

G07                  SYNC                 G06
CLOCK       01010101010101010101  01010101010101010101  01010101010101010101
GRAY-START  00000000000000000000  00000000000000000000  00000000000000000000
GRAY-RUN    11111111111111111111  11111111111111111111  11111111111111111111
HI-DATA     00000000000000001111  00000000000000001111  00000000000000001111
or DATA-EDGE
DT-SMPL     00000000110000000000  00000000000000000000  00000000110000000000
REP-LOAD    00000000000000000000  00000000000000000000  00000000000000000000
TRG-LD-BST  00000000000000000000  00000000011000000000  00000000000000000000
TRG-LD-REL  00000000110000000000  00000000110000000000  00000000000000000000
BURST-CTR   01122334455667788000  01122334455667788000  01122334455667788000
TRG-CTR     01111111100000000000  01111111100000000000  00000000000000000000
            F00112233AABBCCDDEEF  F00112233445566778899  9AABBCCDD44556677889
REP-CTR     EEEEEEEEEEFFFFFFFFFF  FFFFFFFFFF8888888888  88888888899999999999
SEQ-CTR     00000000000000000000  00000000011111111111  11111111111111111111
TRG-MAX     11111111111111111111  11111111100000000000  00000000000000000000
            33333333333333333333  333333333DDDDDDDDDD  DDDDDDDDDDDDDDDDDDDD
TRG-REL     00000000000000000000  00000000000000000000  00000000000000000000
            AAAAAAAAAAAAAAAAAAAA  AAAAAAAAA4444444444  4444444444444444444
REP-REL     88888888888888888888  88888888888888888888  88888888888888888888

REP-CE = TRG-LD-REL
```

FIG. 31

```
              G00                      SYNC                    H04(BIT5)
CLOCK         010101010101010101010    01010101010101010101    01010101010101010
GRAY-START    000000000000000000000    00000000000000000000    00000000000000000
GRAY-RUN      111111111111111111111    11111111111111111111    11111111111111111
HI-DATA       000000000000000001111    00000000000000001111    00000000000001111
or DATA-EDGE
DT-SMPL       000000001100000000000    00000000000000000000    00000011000000000
REP-LOAD      000000000000000000000    00000000001100000000    00000000000000000
TRG-LD-BST    000000000000000000000    00000000110000000000    00000000000000000
TRG-LD-REL    000000001100000000000    00000000000000000000    00000011000000000
BURST-CTR     011223344556677880000    01122334455667788000    01122334455660000
TRG-CTR       000000000000000000000    00000000000000000000    00000000000000000
              9AABBCCDD44556677889     9AABBCCDD44556677889    9AABBCC556677889
REP-CTR       EEEEEEEEEFFFFFFFFFFFF    FFFFFFFFFFFF999999999   9999999AAAAAAAAA
SEQ-CTR       111111111111111111111    11111111122222222222    22222222222222222
TRG-MAX       000000000000000000000    00000000000000000000    00000000000000000
              DDDDDDDDDDDDDDDDDDDDD    DDDDDDDDDDCCCCCCCCCCC   CCCCCCCCCCCCCCCCC
TRG-REL       000000000000000000000    00000000000000000000    00000000000000000
              444444444444444444444    44444444455555555555    55555555555555555
REP-REL       888888888888888888888    88888888899999999999    99999999999999999

S06(BIT0)                SYNC                    S05
CLOCK         0101010101010101         0101010101010101        0101010101010101
GRAY-START    0000000000000000         0000000000000000        0000000000000000
GRAY-RUN      1111111111111111         1111111111111111        1111111111111111
HI-DATA       0000000000001111         0000000000001111        0000000000001111
or DATA-EDGE
DT-SMPL       0000001100000000         0000000000000000        0000001100000000
REP-LOAD      0000000000000000         0000000011000000        0000000000000000
TRG-LD-BST    0000000000000000         0000001100000000        0000000000000000
TRG-LD-REL    0000001100000000         0000000000000000        0000001100000000
BURST-CTR     0112233445566000         0112233445566000        0112233445566000
TRG-CTR       0000000000000000         0000000000000000        0000000000000000
              9AABBCC556677889         9AABBCC334455667        78899AA334455667
REP-CTR       EEEEEEEFFFFFFFFF         FFFFFFFFF9999999        9999999AAAAAAAAA
SEQ-CTR       2222222222222222         2222222333333333        3333333333333333
TRG-MAX       0000000000000000         0000000000000000        0000000000000000
              CCCCCCCCCCCCCCCC         CCCCCCCAAAAAAAAA        AAAAAAAAAAAAAAAA
TRG-REL       0000000000000000         0000000000000000        0000000000000000
              5555555555555555         5555555333333333        3333333333333333
REP-REL       9999999999999999         9999999999999999        9999999999999999
```

FIG. 32

|  | S00 | TERM |
|---|---|---|
| CLOCK | 0101010101010101 | 0101010101010101 |
| GRAY-START | 0000000000000000 | 0000000000000000 |
| GRAY-RUN | 1111111111111111 | 1111111111000000000 |
| HI-DATA or DATA-EDGE | 0000000000001111 | XXXXXXXXXXXXXXXXX |
| DT-SMPL | 0000001100000000 | 000000000000XXXXXX |
| REP-LOAD | 0000000000000000 | 0000000000110XXXXXX |
| TRG-LD-BST | 0000000000000000 | 000000000110XXXXXXXX |
| TRG-LD-REL | 0000001100000000 | 00000000000XXXXXXXXX |
| BURST-CTR | 0112233445566000 | 0112233445566778800 |
| TRG-CTR | 0000000000000000 | 0000000000XXXXXXXX |
| REP-CTR | 9AABBCC556677889<br>EEEEEEFFFFFFFFF | 9AABBCC5566XXXXXXXX<br>FFFFFFFFFFXXXXXXXX |
| SEQ-CTR | 3333333333333333 | 33333333344444444444 |
| TRG-MAX | 0000000000000000<br>AAAAAAAAAAAAAAAA | 000000000XXXXXXXXXX<br>AAAAAAAAXXXXXXXXX |
| TRG-REL | 0000000000000000<br>3333333333333333 | 000000000XXXXXXXXXX<br>33333333XXXXXXXXXX |
| REP-REL | 9999999999999999 | 999999999XXXXXXXXX |

FIG. 33

| G-SYNC 0*14-1,1 | G13-G07 10*7 | G-SYNC 0*8-1,1 | G06-G00 10*7 | G-SYNC 0*8-1,1 | H04-S06 8*6 | G-SYNC 0*6-1,1 | S05-P 8*6 |

METHOD OF DETECTING POSITION ON DISK, DISK UNIT AND DISK

BACKGROUND OF THE INVENTION

The present invention generally relates to methods of detecting a position on a disk, disk units and disks, and more particularly to a method of detecting a position on a disk which is time-divisionally recorded with a data region and a servo region based on a signal read from the disk, a disk unit which employs such a method, and a disk for use in such a disk unit.

Conventionally, there was a method of detecting a position on a magnetic disk by recording 4 kinds of servo mark patterns in a servo region of the magnetic disk. According to this method, an operation is carried out with respect to reproduced signal waveforms of 2 kinds of servo mark patterns out of the 4 kinds of servo mark patterns reproduced by a head, and the detection on the magnetic disk is detected based on a result of the operation. However, since each position on the magnetic disk is detected based on the reproduced signal waveforms of 2 kinds of servo mark patterns out of the 4 kinds of servo mark patterns, there was a problem in that the utilization efficiency of the servo information is poor. In addition, when the head makes a scan so as to traverse cylinders on the magnetic disk during a seek operation or the like, there was a problem in that it is impossible to accurately detect the position on the magnetic disk.

On the other hand, a method of recording the servo mark pattern in 3 kinds of position regions EVEN1, ODD and EVEN2 in the servo region on the magnetic disk has recently been proposed. When a period of a clock is denoted by T, the servo mark pattern is recorded with a period of 8T ("10001000") as a base so that a phase shifts by 45° per 1 cylinder. As a result, it is possible to detect the position on the magnetic disk based on the phase of the servo mark pattern which is reproduced by the head, and the utilization efficiency of the servo information is improved. In addition, even in a case where the head traverses the cylinders on the magnetic disk, it is possible to accurately detect the position on the magnetic disk based on the phase of the servo mark pattern which is reproduced by the head. This kind of method of detecting the position on the magnetic disk is sometimes referred to as a phase demodulation technique.

However, in the proposed method described above, a demodulating circuit with respect to the servo information and a demodulating circuit with respect to the data are provided independently. For this reason, there was a problem in that the circuit scale of the demodulating system becomes large, thereby increasing the cost of the disk unit.

Further, the demodulating circuit with respect to the servo information uses a circuit which is set and reset depending on the servo information reproduced by the head, and is designed to convert a time interval between the setting and the resetting to the position information. As a result, there was another problem in that it is impossible to accurately detect the position on the magnetic disk depending on a scanning speed of the head.

SUMMARY OF THE INVENTION

Accordingly, it is a general object of the present invention to provide a novel and useful method of detecting a position on a disk, disk unit and disk, in which the problems described above are eliminated.

Another and more specific object of the present invention is to provide a method of detecting a position on a disk, a disk unit and a disk, which can reduce the circuit scale of a demodulating system and reduce the cost of the disk unit by using a portion of a demodulating circuit with respect to servo information in common with a portion of a demodulating circuit with respect to data, and can always accurately detect the position on the disk regardless of a scanning speed of a head.

Still another object of the present invention is to provide a method of detecting a position on a disk which is time-divisionally recorded with a data region and a servo region based on a signal read from the disk, where the servo region is recorded with a servo pattern having a length of consecutive "0"s longer than a length of consecutive "0"s existing in the data region, the servo pattern has three or more zones with consecutive "0"s, and the method comprises the steps of (a) digitizing the signal read from the disk and slicing at a predetermined level so as to convert the signal into "0" or "1", and (b) detecting the servo pattern when two zones with consecutive "0"s are detected from information converted- by the step (a). According to the method of the present invention, it is possible to correctly detect the servo mark pattern, even when a bit dropout or a data generation source is introduced, thereby preventing an unnecessary read retry operation or the like and improving the access speed.

A further object of the present invention is to provide a method of detecting a position on a disk which is time-divisionally recorded with a data region and a servo region based on a signal read from the disk according to a phase demodulation technique, comprising the steps of variably setting, depending on a seek speed, an integrating interval in which position information is demodulated by integrating a signal read from the servo region. According to the method of the present invention, it is possible to correctly detect the servo mark pattern, even when a bit dropout or a data generation source is introduced, thereby preventing an unnecessary read retry operation or the like and improving the access speed.

Another object of the present invention is to provide a method of detecting a position on a disk which is time-divisionally recorded with a data region and a servo region based on a signal read from the disk according to a phase demodulation technique, comprising the steps of correcting an error between a clock signal and data when reading a Gray code recorded in the servo region by use of the clock signal which is asynchronous to the signal read from the disk. According to the method of the present invention, it is possible to accurately detect the position even during a high-speed seek operation, by varying the integrating interval depending on the seek speed.

Still another object of the present invention is to provide a method of detecting a position on a disk which is time-divisionally recorded with a data region and a servo region based on a signal read from the disk according to a phase demodulation technique, where a servo mark pattern is recorded in three kinds of position regions EVEN1, ODD and EVEN2 in the servo region, and the method comprises the steps of converting a phase of the servo mark pattern in the position regions EVEN1 and EVEN2 into a phase of the servo mark pattern at an approximate center of the position region ODD. According to the method of the present invention, it is possible to prevent a phenomenon in which the clock signal and the data gradually become asynchronous when a long signal is read when reading the Gray code.

A further object of the present invention is to provide a disk unit for detecting a position on a disk according to a phase demodulation technique based on a signal read from a disk which is time-divisionally recorded with a data region and a servo region, where the servo region is recorded with a servo pattern having a length of consecutive "0"s longer than a length of consecutive "0"s existing in the data region, the servo pattern has three or more zones with consecutive "0"s, and the method comprises converting means for digitizing the signal read from the disk and slicing at a predetermined level so as to convert the signal into "0" or "1", and detecting means for detecting the servo pattern when two zones with consecutive "0"s are detected from information converted by the converting means. According to the disk unit of the present invention, it is possible to correctly detect the servo mark pattern, even when a bit dropout or a data generation source is introduced, thereby preventing an unnecessary read retry operation or the like and improving the access speed.

Another object of the present invention is to provide a disk unit for detecting a position on a disk which is time-divisionally recorded with a data region and a servo region based on a signal read from the disk according to a phase demodulation technique, comprising setting means for variably setting, depending on a seek speed, an integrating interval in which position information is demodulated by integrating a signal read from the servo region. According to the disk unit of the present invention, it is possible to accurately detect the position even during a high-speed seek operation, by varying the integrating interval depending on the seek speed.

Still another object of the present invention is to provide a disk unit for detecting a position on a disk which is time-divisionally recorded with a data region and a servo region based on a signal read from the disk according to a phase demodulation technique, comprising correcting means for correcting an error between a clock signal and data when reading a Gray code recorded in the servo region by use of the clock signal which is asynchronous to the signal read from the disk. According to the disk unit of the present invention, it is possible to prevent a phenomenon in which the clock signal and the data gradually become asynchronous when a long signal is read when reading the Gray code.

A further object of the present invention is to provide a disk unit for detecting a position on a disk which is time-divisionally recorded with a data region and a servo region based on a signal read from the disk according to a phase demodulation technique, where a servo mark pattern is recorded in three kinds of position regions EVEN1, ODD and EVEN2 in the servo region, and the disk unit comprises detecting means for converting a phase of the servo mark pattern in the position regions EVEN1 and EVEN2 into a phase of the servo mark pattern at an approximate center of the position region ODD. According to the disk unit of the present invention, it is possible to prevent an erroneous detection of the position during a seek operation by using a head moving speed when demodulating the servo information.

Another object of the present invention is to provide a disk having a position thereon detected according to a phase demodulation technique, comprising a data region and a servo region which are time-divisionally recorded, and a servo pattern having a length of consecutive "0"s longer than a length of consecutive "0"s existing in the data region, where the servo pattern has three or more zones with consecutive "0"s. According to the disk of the present invention, it is possible to correctly detect the servo mark pattern, even when a bit dropout or a data generation source is introduced, thereby preventing an unnecessary read retry operation or the like and improving the access speed.

Other objects and further features of the present invention will be apparent from the following detailed description when read in conjunction with the accompanying drawings.

BRIEF DESCRIPTION OF THE DRAWINGS

FIG. 3 is a diagram for explaining a servo frame format;

FIG. 10 is a system block diagram showing a 1−D2 creating circuit of the level slice circuit;

FIG. 18 is a diagram showing a state where the servo mark pattern shown in FIG. 16 is detected even when a 1-bit dropout is generated in the servo mark pattern;

FIG. 19 is a diagram showing a state where the servo mark pattern shown in FIG. 16 is detected even when a data generation source is introduced in the servo mark pattern;

FIGS. 26A and 26B respectively are diagrams for explaining another method of setting the integration period;

FIG. 30 is a timing chart for explaining the operations of the circuit parts shown in FIGS. 28 and 29;

FIG. 31 is a timing chart for explaining the operations of the circuit parts shown in FIGS. 28 and 29;

FIG. 32 is a timing chart for explaining the operations of the circuit parts shown in FIGS. 28 and 29;

FIG. 33 is a diagram for explaining a Gray code sync;

DESCRIPTION OF THE PREFERRED EMBODIMENTS

Figure 1:
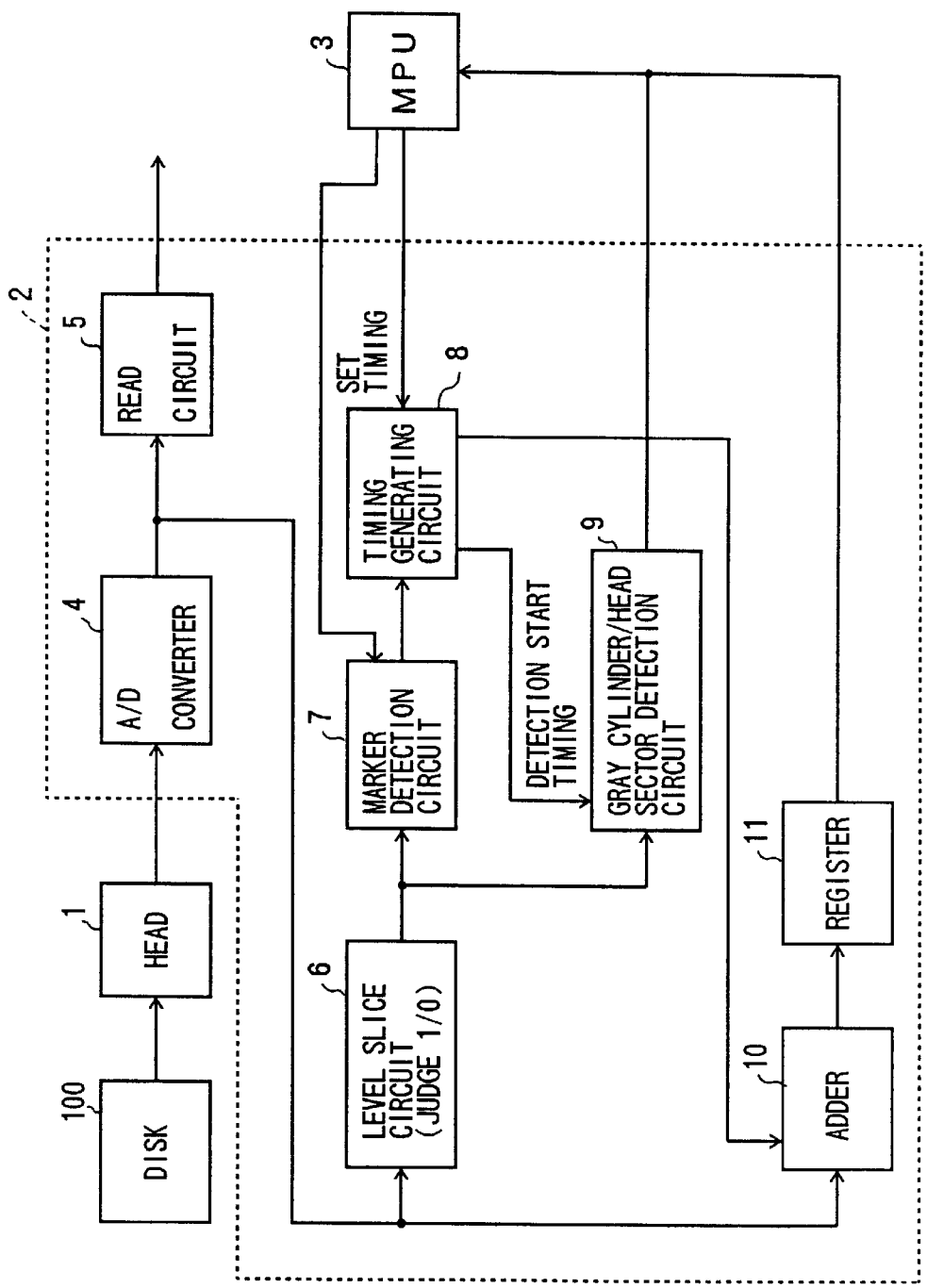
FIG. 1 is a system block diagram showing the construction of an important part of an embodiment of a disk unit according to the present invention.

FIG. 1 is a system block diagram showing the construction of an important part of an embodiment of a disk unit according to the present invention. This embodiment of the disk unit employs an embodiment of a method of detecting a position on a disk according to the present invention, and embodiment of a disk according to the present invention. In addition, in this embodiment, the present invention is applied to a magnetic disk unit which uses the phase demodulation technique. In the following description, it is assumed for the sake of convenience that one magnetic disk and one magnetic head are provided in the magnetic disk unit, however, the magnetic disk unit may of course be provided with a plurality of magnetic disks and a plurality of magnetic heads.

In FIG. 1, a reproducing system of the magnetic disk unit generally includes a magnetic head 1, a read channel 2, and a microprocessor unit (MPU) 3. The head 1 reads a signal from a magnetic disk 100 and supplies the read signal to the read channel 2. A data region and a servo region are time-divisionally recorded on the disk 100, and in the servo region, a servo mark pattern is recorded in 3 kinds of position regions EVEN1, ODD and EVEN3. When a period of a clock is denoted by T, the servo mark pattern is recorded with a period of 8T ("10001000") as a base so that a phase shifts by 45° per 1 cylinder, and a position on the disk 100 is detected based on the phase of the servo mark pattern reproduced by the head 1. In this embodiment, a length of consecutive "0"s in the servo mark pattern is longer than a length of consecutive "0"s existing in the data region, and a number of zones where consecutive "0"s exist in the servo mark pattern is 3 or more.

Figure 2:
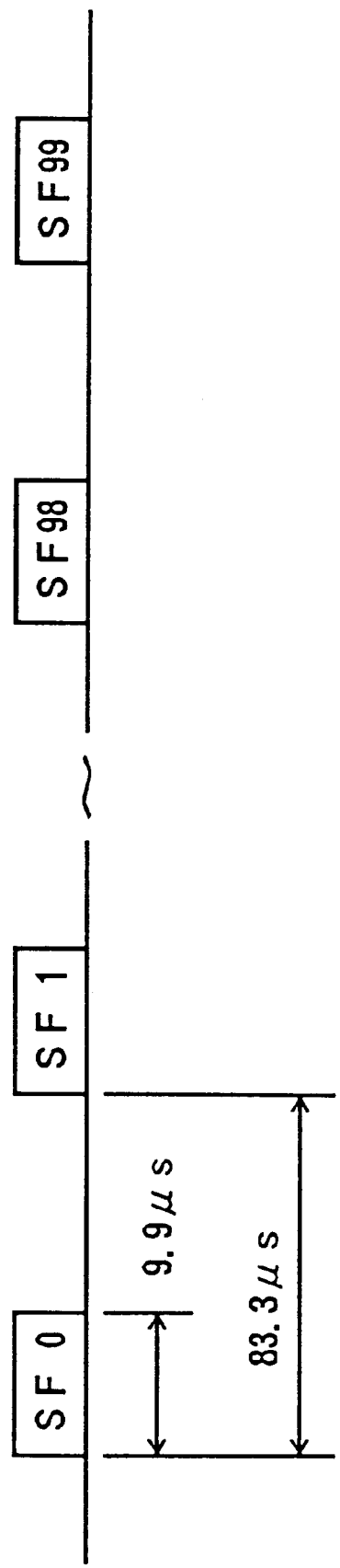
FIG. 2 is a diagram for explaining a servo track format.
Figure 4:
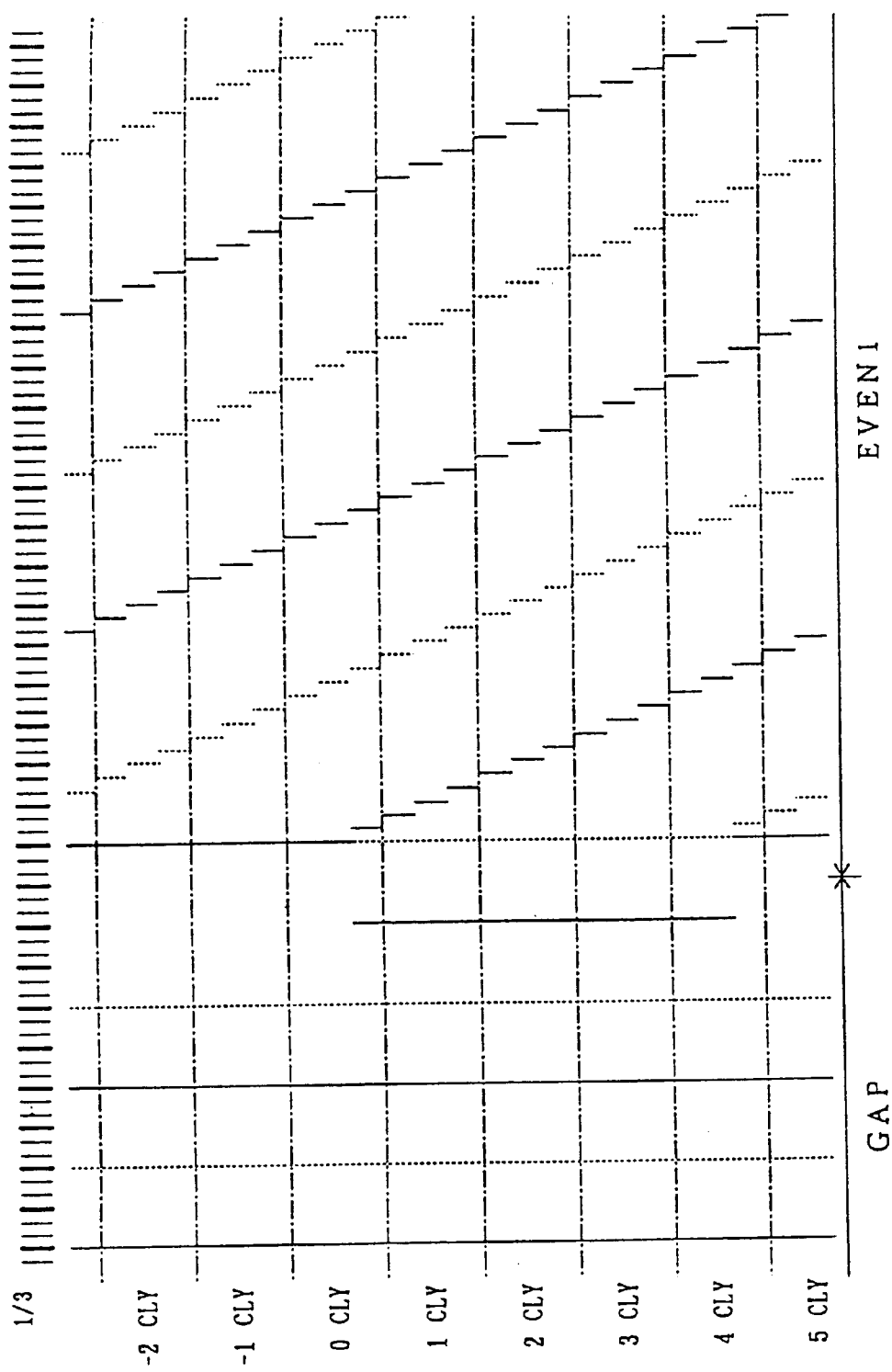
FIG. 4 is a diagram showing a recording pattern in a vicinity of a position region.
Figure 5:
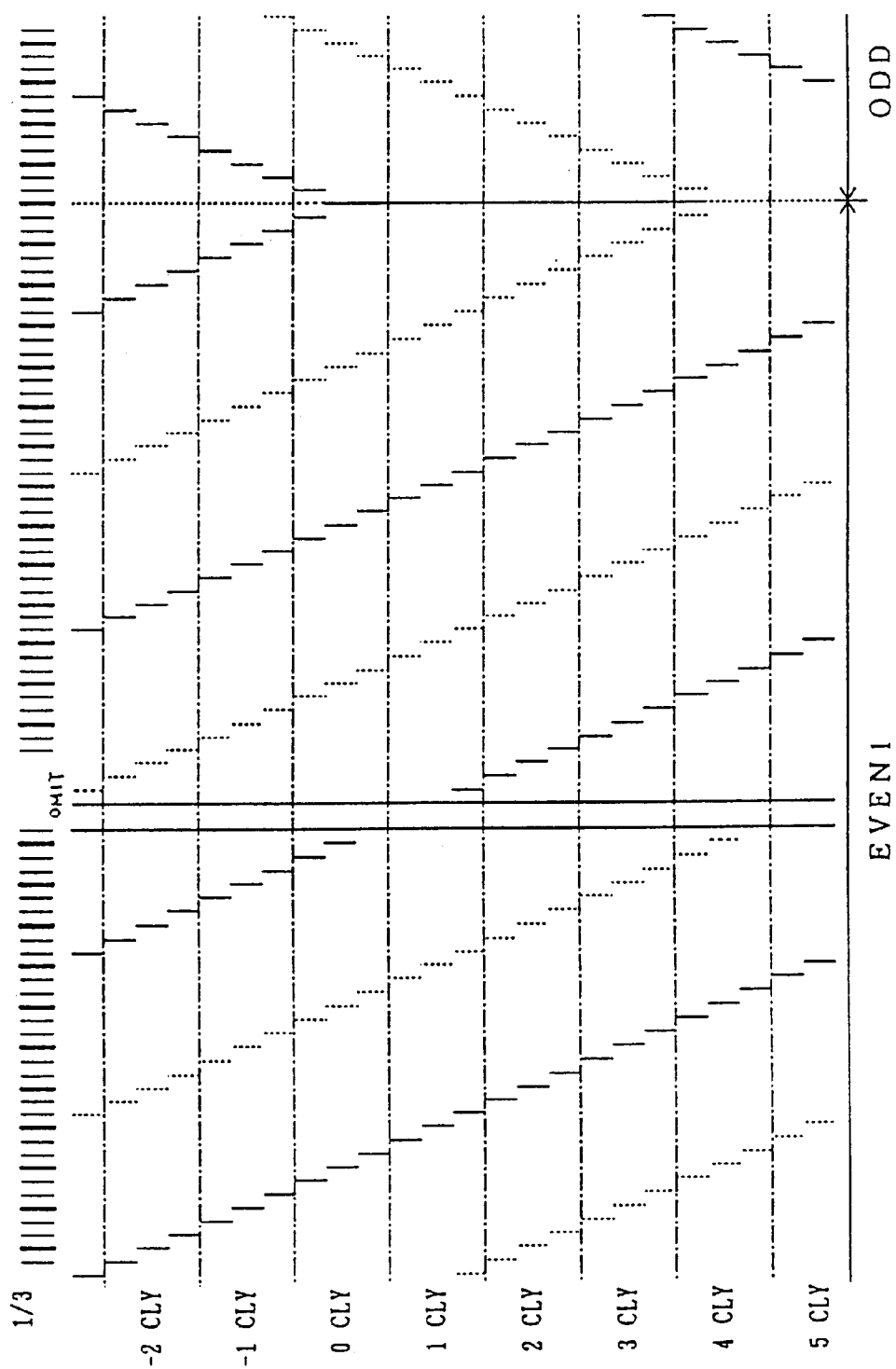
FIG. 5 is a diagram showing a recording pattern in the vicinity of the position region.
Figure 6:
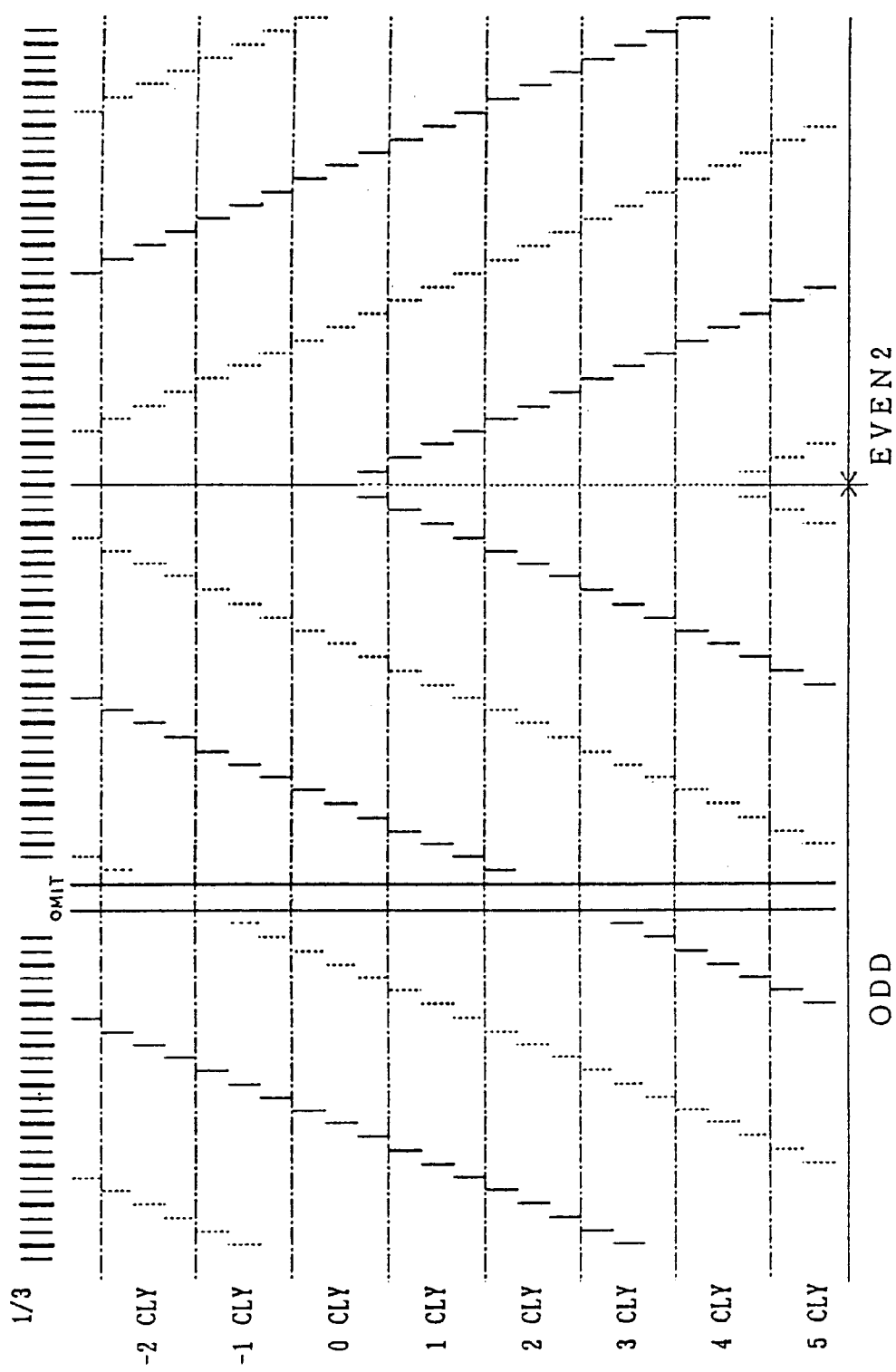
FIG. 6 is a diagram showing a recording pattern in the vicinity of the position region.
Figure 7:
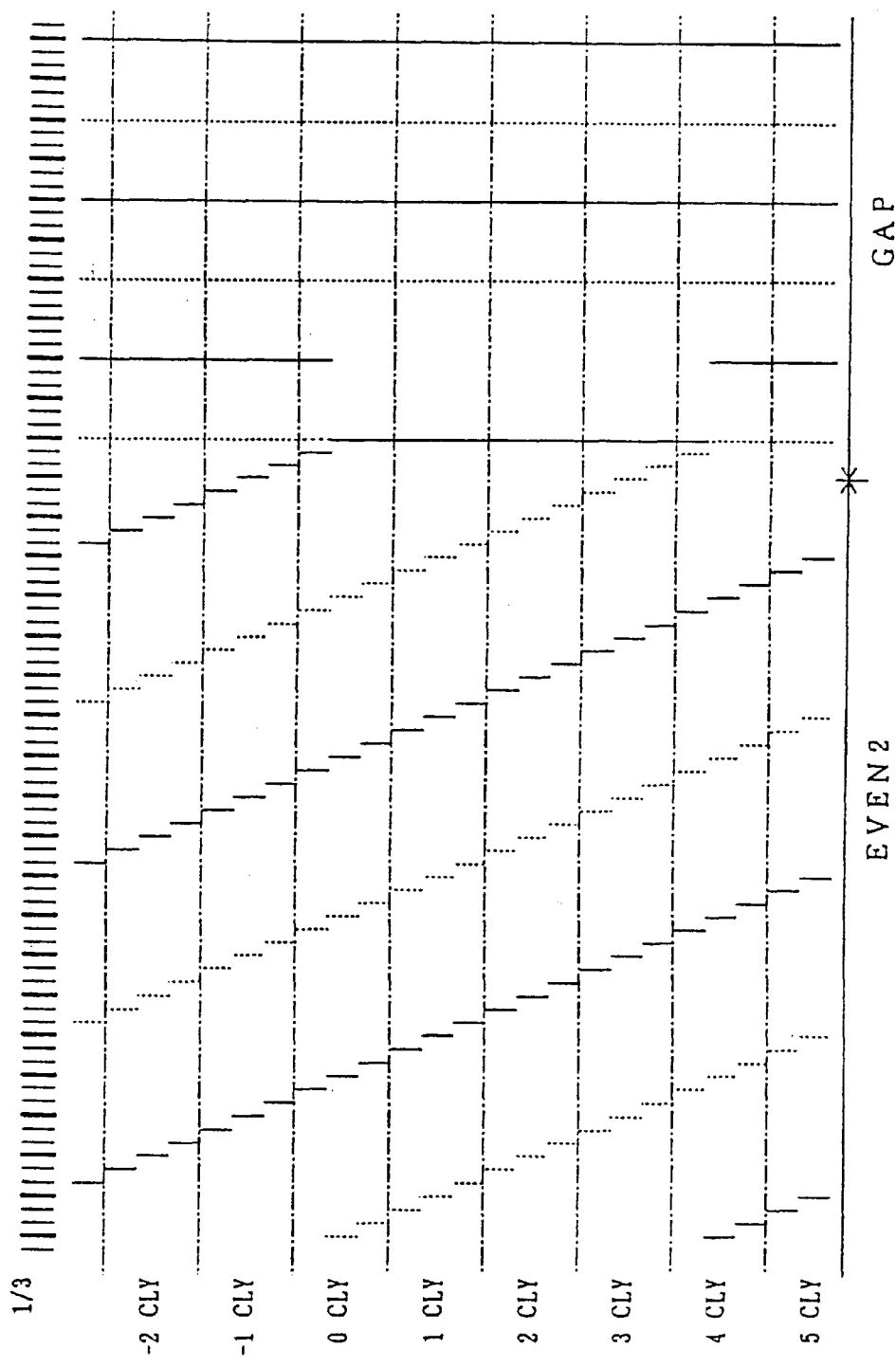
FIG. 7 is a diagram showing a recording pattern in the vicinity of the position region.

FIG. 2 is a diagram for explaining a servo track format on the disk 100. In this embodiment, 1 track is made up of 100 servo frames SF0 through SF99 as shown in FIG. 2.

FIG. 3 is a diagram for explaining a servo frame format. As shown in FIG. 3, each of the servo frames SF0 through SF99 is made up of a read/write recovery region R/WRR, a servo mark region SMK, a gap region GAP, a position region POS, a gap region GAP, a Gray code region GCR, and a gap region GAP.

The read/write recovery region R/WRR is made up of a repetition of 2T data of "10", and is provided to absorb a transient that is generated when the operation switches from a write operation with respect to the data region to a read operation with respect to the servo region.

The servo mark region SMK is written with servo information "00000000000001" in 3 zones. In this embodiment, the servo mark pattern is detected when 9 consecutive "0"s ("000000000") are detected in 2 zones out of these 3 zones. The servo mark region SMK is provided to decide a start of the position region POS.

The gap region GAP is provided to guarantee a synchronization error and the like of the servo mark pattern. In addition, a dummy pattern is written in the gap region GAP so that a pattern exceeding 4T will not exist before and after the position region POS.

The position region POS is made up of the position regions EVEN1, ODD and EVEN2 described above.

FIGS. 4 through 7 respectively are diagrams showing a recording pattern in a vicinity of the position region POS. In FIGS. 4 through 7, −2CLY through 5CLY indicate cylinders on the disk 100, a one-dot chain line extending in a horizontal direction indicates a boundary line of the cylinders (tracks), a broken line extending in a vertical direction indicates a peak of the S-pole, and a solid line extending in the vertical direction indicates a peak of the N-pole.

Returning now to the description of FIG. 3, cylinder address information of the disk 100 is encoded and Gray code bits are recorded at 10T intervals in the Gray code region GCR. A Gray code mark GMK which indicates a starting point of the Gray code is recorded at the start of the Gray code region GCR, and cylinder address information CAI, head address information HAI, servo sector address information SSAI, an odd parity bits PB created from a head address and a servo sector address, and dummy bits DB are recorded subsequent to the Gray code mark GMK. In the Gray code region GCR, the odd parity bits PB and the dummy bits DB are not encoded by the Gray code, but the other information is encoded by the Gray code. 3 synchronizing zones for synchronizing the data to a read clock when reading the data are provided in the Gray code region GCR, so that a synchronization error is uneasily generated even when the data "0" consecutively occurs.

Returning now to the description of FIG. 1, the read channel 2 generally includes an analog-to-digital (A/D) converter 4, a read circuit 5, a level slice circuit 6, a marker detection circuit 7, a timing generating circuit 8, a Gray cylinder/head sector detection circuit 9, an adder circuit 10, and a register 11. The read circuit 5 forms a demodulating circuit with respect to the data. On the other hand, the level slice circuit 6, the marker detection circuit 7, the timing generating circuit 8, the Gray cylinder/head sector detection circuit 9, the adder circuit 10 and the register 11 form a demodulating circuit with respect to the servo information. These demodulating circuits are made up of digital circuits.

The A/D converter 4 is provided in common with respect to the data demodulating circuit and the servo information demodulating circuit. The A/D converter 4 subjects a signal reproduced from the disk 10 by the head 1 to an A/D conversion, and supplies a digital reproduced signal to the read circuit 5, the level slice circuit 6 and the adder circuit 10. Out of the digital reproduced signal, the read circuit 5 demodulates the data read from the data region on the disk 100, and supplies demodulated data to a circuit which is provided at a subsequent stage and is not shown in FIG. 1.

The level slice circuit 6 slices the digital reproduced signal from the A/D converter 4 at a predetermined level so as to judge whether the digital reproduced signal is "0" or "1", and converts the digital reproduced signal into a signal indicating "0" or "1". The marker detection circuit 7 counts a number of times a zone with consecutive "0"s is generated based on the signal indicating "0" or "1" from the level slice circuit 6, and detects a servo mark pattern when a zone with at least 9 consecutive "0"s is generated twice. The marker detection circuit 7 asynchronously detects the servo mark pattern, and supplies to the timing generating circuit 8 a detection signal which indicates a timing with which the servo mark pattern is detected.

When the servo mark pattern is detected, the position regions EVEN1, ODD and EVEN2 and the Gray code region GCR recorded with the Gray code follow this servo mark pattern, as described above in conjunction with FIG. 3. Based on the detection signal received from the marker detection circuit 7, the timing generating circuit 8 generates timing signals which indicate detection start timings of each of the position regions EVEN1, ODD and EVEN2 and the Gray code region GCR. The timing signals indicating the detection start timings of each of the position regions EVEN1, ODD and EVEN2 are supplied to an adder circuit 10. Out of the digital reproduced signal obtained from the A/D converter 4, the adder circuit 10 adds the servo information read from each of the position regions EVEN1, ODD and EVEN2 using a digital Fourier transform (DFT) technique, based on the timing signals indicating the detection start timings of each of the position regions EVEN1, ODD and EVEN2, so as to obtain phase information indicating the position on the disk 100. This phase information is stored in the register 11. On the other hand, the Gray cylinder/head sector detection circuit 9 detects the Gray code from the output signal of the level slice circuit 6 based on the timing signal which indicates the detection start timing of the Gray code region GCR and is obtained from the timing generating circuit 8, and supplies the detected Gray code to the MPU 3.

The MPU 3 sets a generating timing of the timing signals generated by the timing generating circuit 8, and decodes the Gray code obtained from the Gray cylinder/head sector detection circuit 9. Based on the decoded result and the phase information stored in the register 11, the MPU 3 detects the position of the head 1 on the disk 100.

FIGS. 8 through 12 respectively are system block diagrams showing an embodiment of the level slice circuit 6. The level slice circuit 6 includes a delay circuit 61 shown in FIG. 8, a 1+D creating circuit 62 shown in FIG. 9, a 1+D2 creating circuit 63 shown in FIG. 10, a slice circuit 64 shown in FIG. 11, and a ¼T detection circuit 65 shown in FIG. 12.

Figure 8:
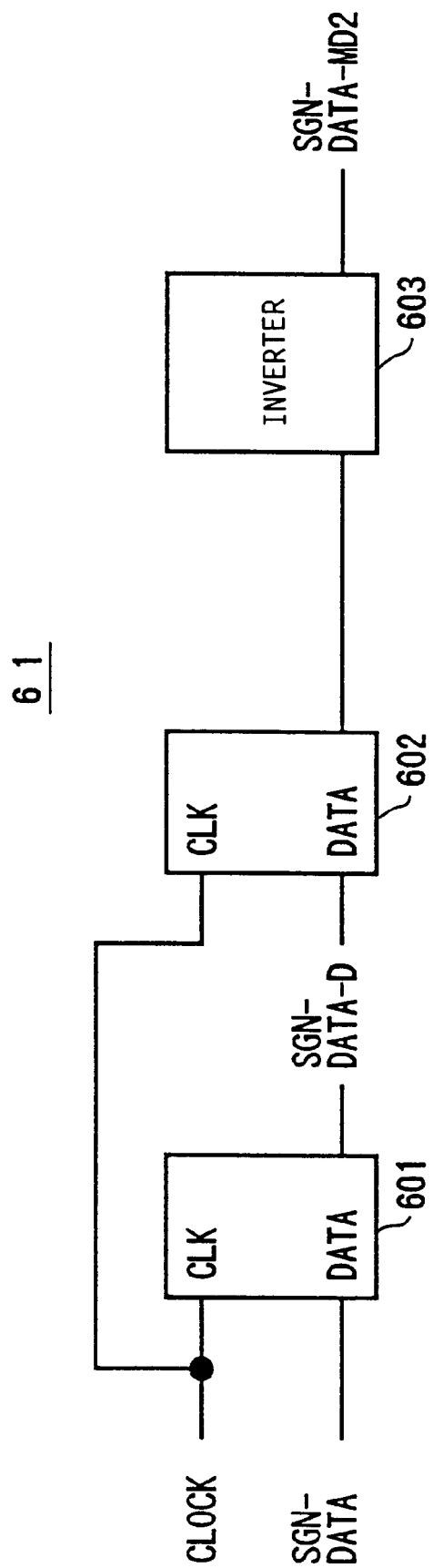
FIG. 8 is a system block diagram showing a delay circuit of a level slice circuit.

The delay circuit 61 includes flip-flops 601 and 602, and an inverter circuit 603 which are connected as shown in FIG. 8. A clock signal CLOCK is input to a clock input terminal CLK of each of the flip-flops 601 and 602, and a digital reproduced signal SGN-DATA from the A/D converter 4 is input to a data input terminal DATA of the flip-flop 601. An output signal SGN-DATA-D of the flip-flop 601 is input to a data input terminal DATA of the flip-flop 602 and the 1+D creating circuit 62 shown in FIG. 9. The inverter circuit 603 inverts an output signal of the flip-flop 602, and outputs a signal SGN-DATA-MD2 which is input to the 1−D2 creating circuit 63 shown in FIG. 10. Accordingly, the delay circuit 61 delays the digital reproduced signal SGN-DATA from the A/D converter 4 by 1 clock and 2 clocks, and outputs the signal which is delayed by 2 clocks after inverting this signal. The inverter circuit 603 is provided to obtain a negative value of the digital reproduced signal SGN-DATA. The digital reproduced signal SGN-DATA is represented by a two's complement, and originally, the negative value of the digital reproduced signal SGN-DATA is obtained by adding 1 to the value which is obtained by inverting all bits. But in this embodiment, a circuit for adding 1 is omitted in order to reduce the circuit scale.

Figure 9:
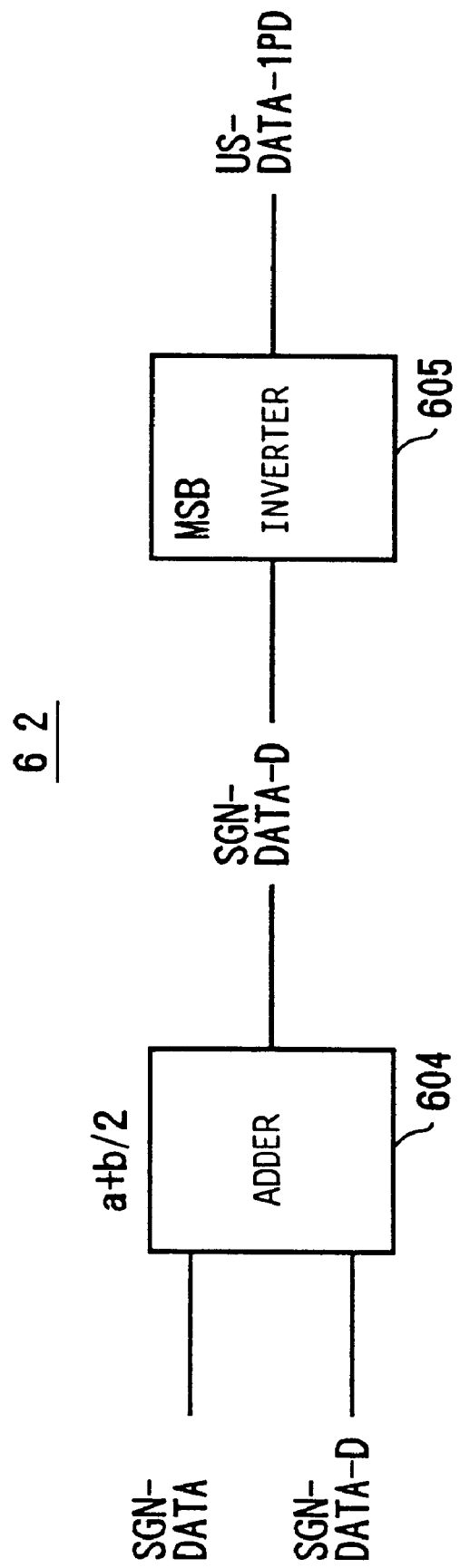
FIG. 9 is a system block diagram showing a 1+D creating circuit of the level slice circuit.

The 1+D creating circuit 62 is provided to eliminate a wide band noise in the digital reproduced signal SGN-DATA, and includes an adder circuit 604 and a most significant bit (MSB) inverter circuit 605 which are connected as shown in FIG. 9. The adder circuit 604 adds the digital reproduced signal SGN-DATA and a delayed signal SGN-DATA-D which is delayed by 1 clock, and divides a sum by 2 so as to output an average value signal SGN-DATA-1PD. The MSB inverter circuit 605 inverts the MSB of the average value signal SGN-DATA-1PD, and outputs a signal US-DATA-1PD. Because the digital reproduced signal SGN-DATA is a data added with a code and it is difficult to make a size comparison in the slice circuit 64 which will be described later, this MSB inverter circuit 605 is provided to facilitate the size comparison. However, depending on the circuit construction provided at a subsequent stage, it is possible to omit this MSB inverter circuit 605.

The 1−D2 creating circuit 63 is provided to obtain a slope of the digital reproduced signal SGN-DATA, and includes an adder circuit 606 and a MSB inverter circuit 607 which are connected as shown in FIG. 10. The adder circuit 606 adds the digital reproduced signal SGN-DATA and a delayed signal SGN-DATA-MD2 which is delayed by 2 clocks, and divides a sum by 2 so as to output an average value signal SGN-DATA-1MD2. The MSB inverter circuit 607 inverts the MSB of the average value signal SGN-DATA-1MD2, and outputs a signal US-DATA-1MD2. Because the digital reproduced signal SGN-DATA is a data added with a code and it is difficult to make a size comparison in the slice circuit 64 which will be described later, this MSB inverter circuit 607 is provided to facilitate the size comparison. However, depending on the circuit construction provided at a subsequent stage, it is possible to omit this MSB inverter circuit 607.

Figure 11:
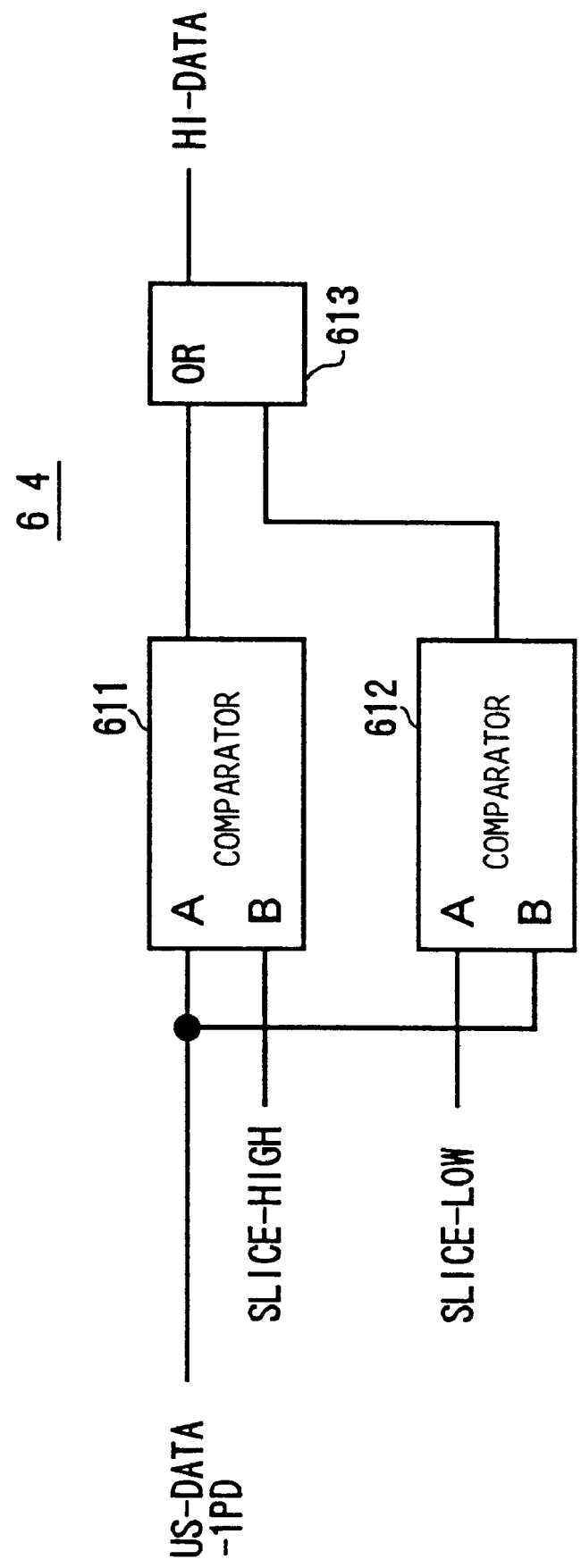
FIG. 11 is a system block diagram showing a slice circuit of the level slice circuit.

The slice circuit 64 is provided to judge the "0" and "1" in the low-frequency band of the digital reproduced signal SGN-DATA, and includes comparator circuits 611 and 612, and a logical sum (OR) circuit 613 which are connected as shown in FIG. 11. The signal US-DATA-1PD from the 1+D creating circuit 62 is input to an input terminal A of the comparator circuit 611 and an input terminal B of the comparator circuit 612. In addition, a high slice level SLICE-HIGH is input to an input terminal B of the comparator circuit 611, and a low slice level SLICE-LOW is input to an input terminal A of the comparator circuit 612. These slice levels SLICE-HIGH and SLICE-LOW may be fixed or, set from the MPU3, for example. Each of the comparator circuits 611 and 612 outputs a high-level signal when the signal level input to the input terminal A is higher than the signal level input to the input terminal B. The OR circuit 613 receives output signals of the comparator circuits 611 and 612, and outputs a signal HI-DATA which has a high level ("1") when the signal US-DATA-1PD with no code has a level outside a predetermined threshold value range and otherwise has a low level ("0").

Figure 12:
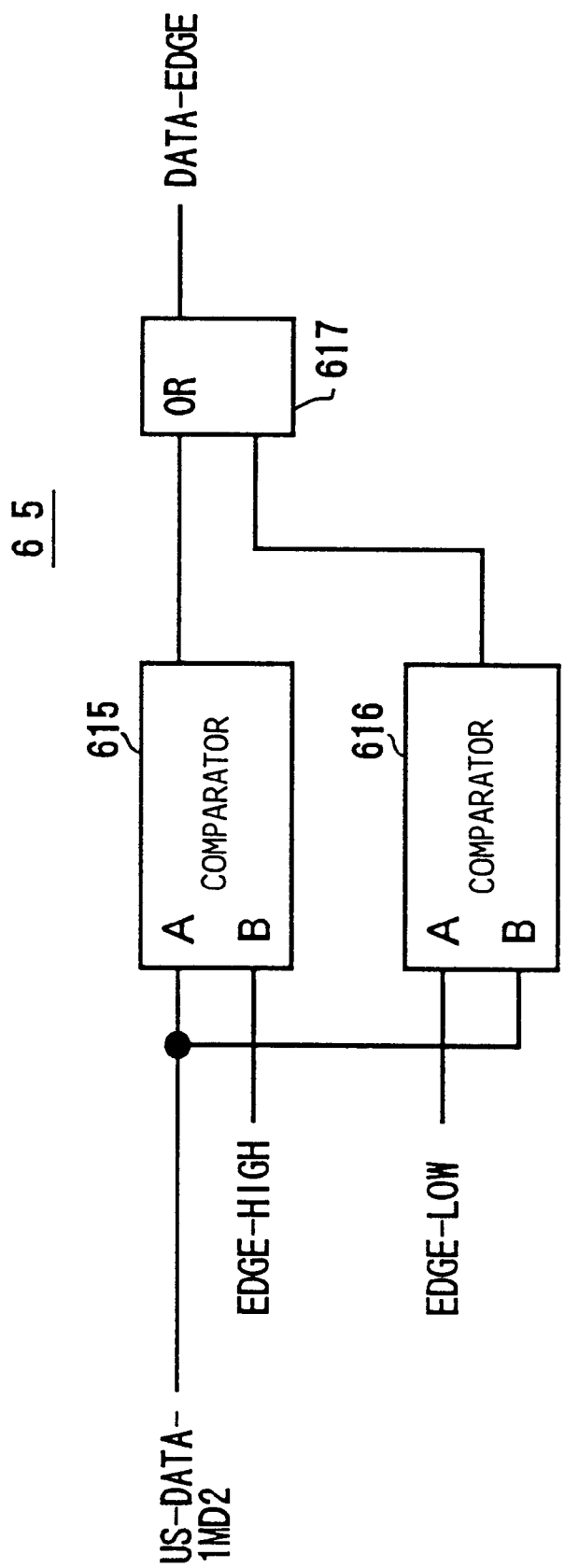
FIG. 12 is a system block diagram showing a ¼T detection circuit of the level slice circuit.

The ¼T detection circuit 65 is provided to judge the "0" and "1" in the high-frequency band of the digital reproduced signal SGN-DATA, and includes comparators 615 and 616, and a logical sum (OR) circuit 617 which are connected as shown in FIG. 12. The signal US-DATA-1MD2 from the 1+D2 creating circuit 63 is input to an input terminal A of the comparator circuit 615 and an input terminal B of the comparator circuit 616. In addition, a high edge detection level EDGE-HIGH is input to an input terminal B of the comparator circuit 615, and a low edge detection level EDGE-LOW is input to an input terminal A of the comparator circuit 616. These detection levels EDGE-HIGH and EDGE-LOW may be fixed or, set from the MPU3, for example. Each of the comparator circuits 615 and 616 outputs a high-level signal when the signal level input to the input terminal A is higher than the signal level input to the input terminal B. The OR circuit 617 receives output signals of the comparator circuits 615 and 616, and outputs a signal DATA-EDGE which has a high level ("1") when a change in the signal US-DATA-1MD2 with no code is outside a predetermined threshold value range and otherwise has a low level ("0").

Figure 13:
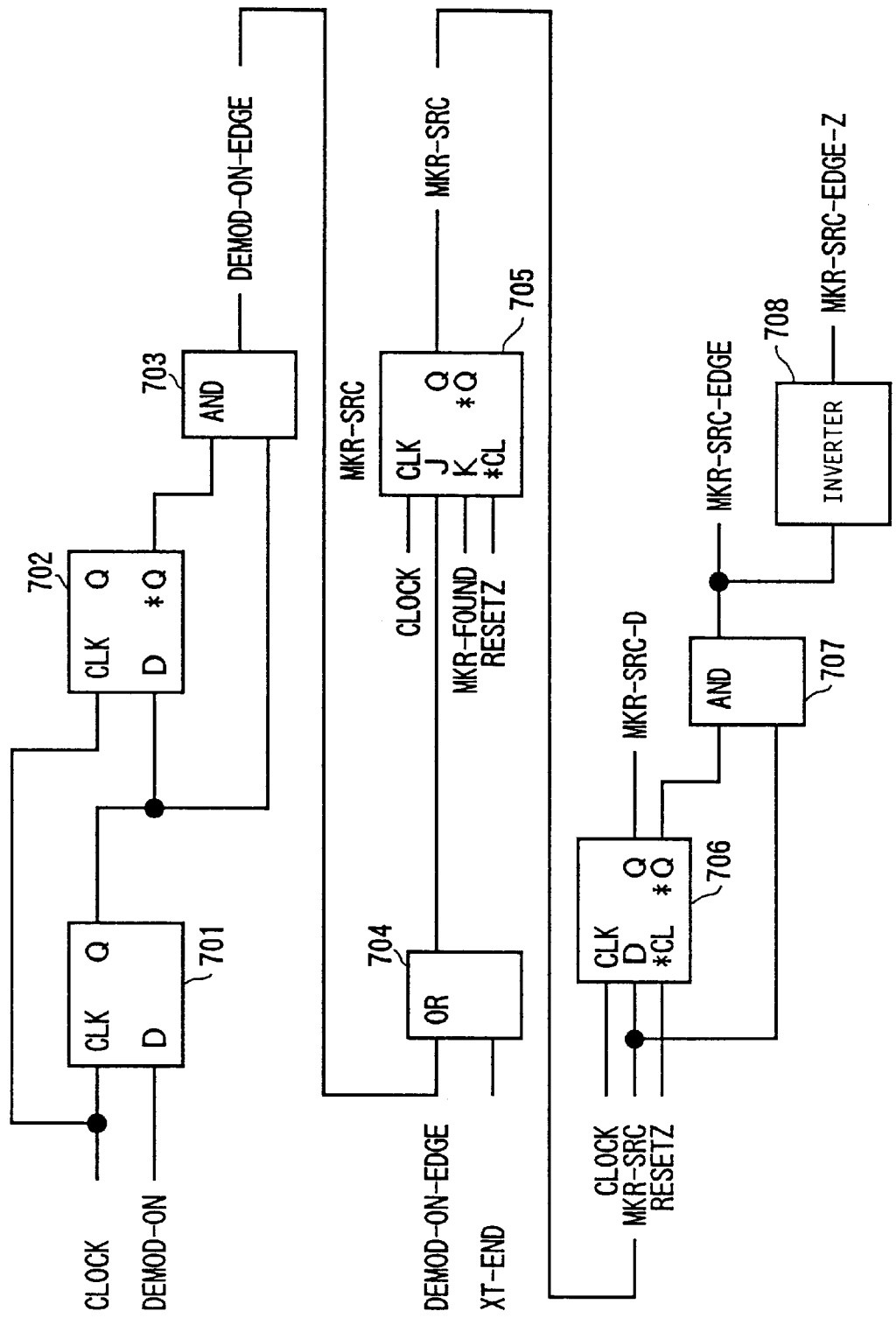
FIG. 13 is a system block diagram showing a detection circuit of a marker detection circuit.
Figure 14:
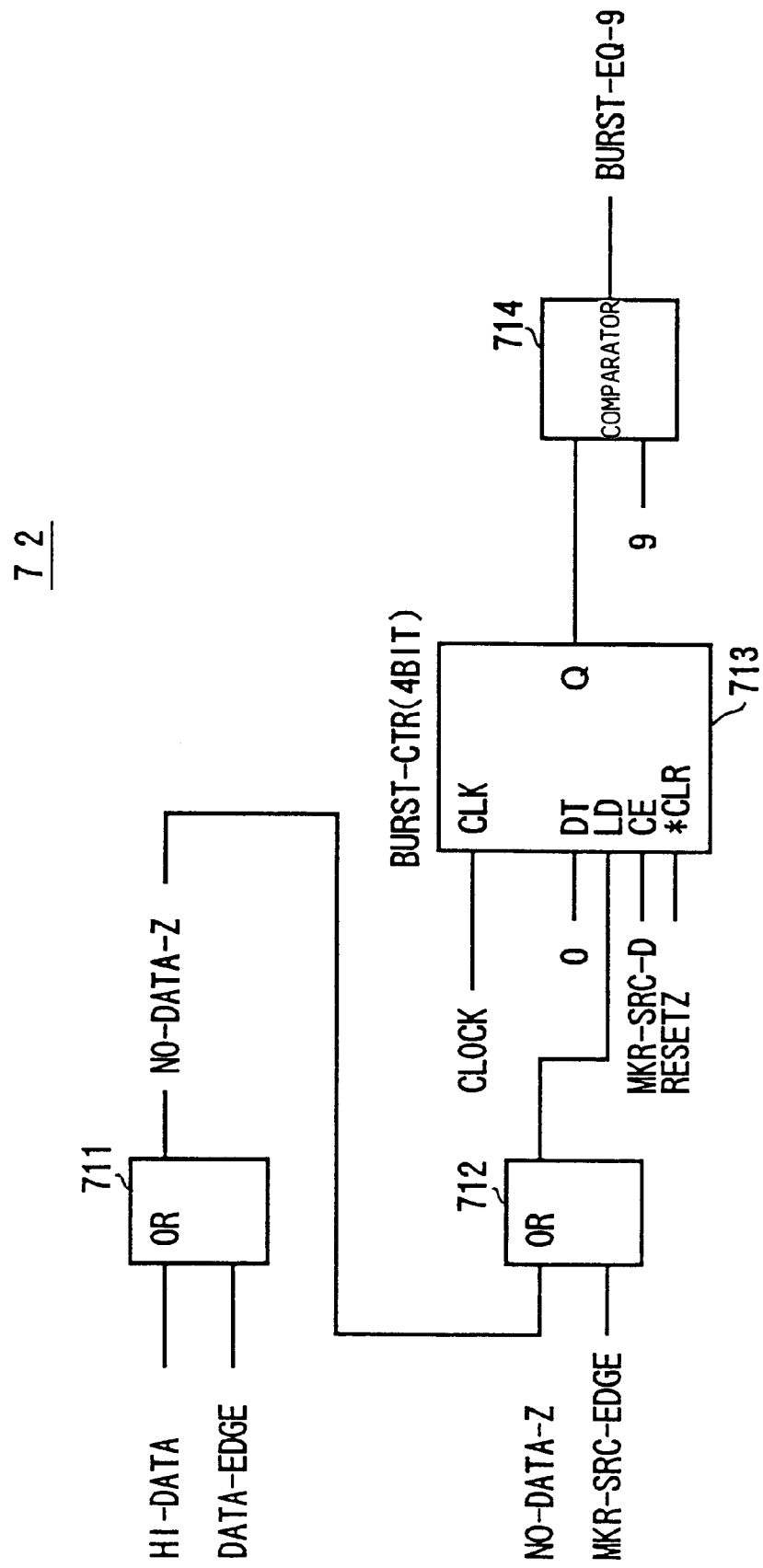
FIG. 14 is a system block diagram showing a burst counter circuit of the marker detection circuit.
Figure 15:
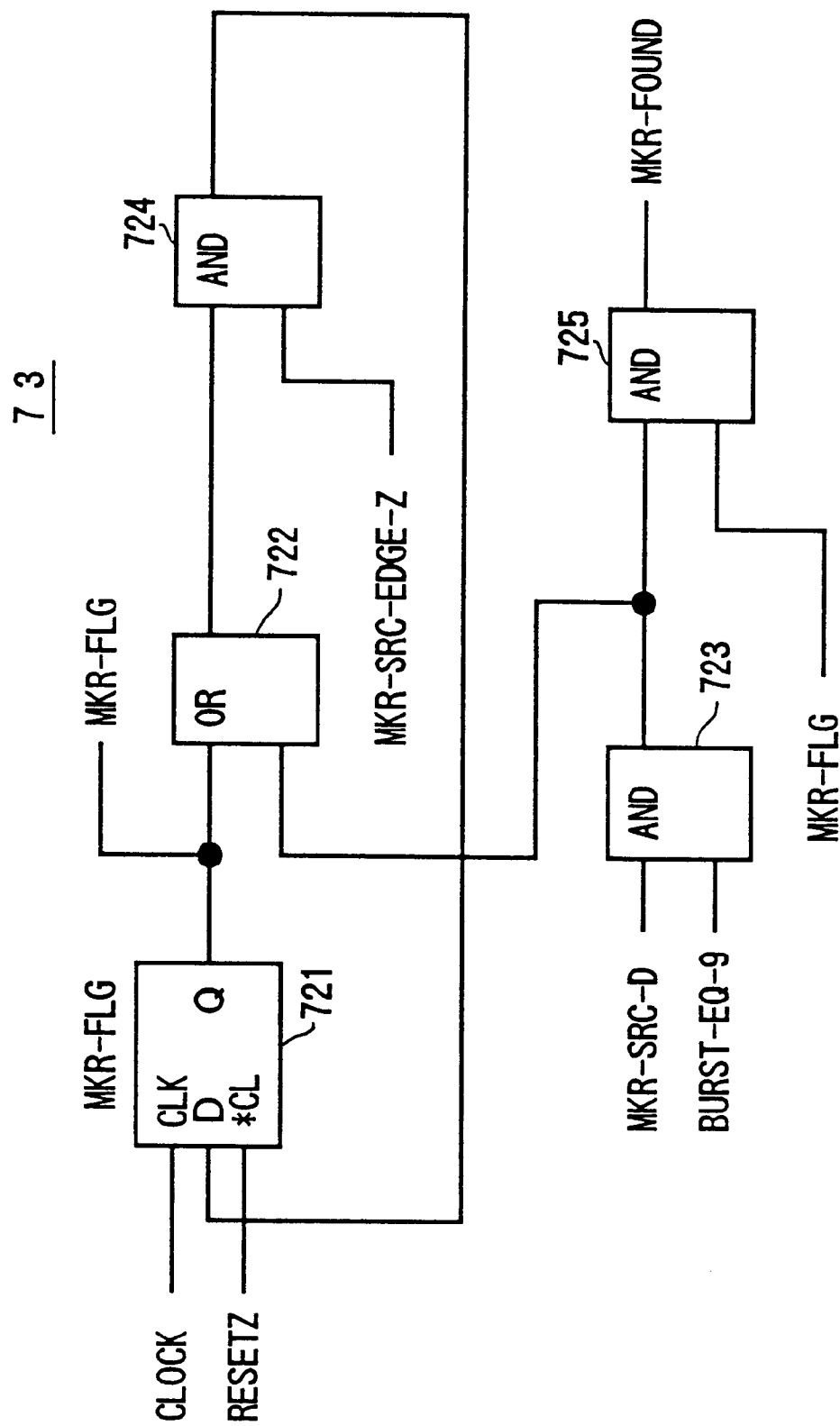
FIG. 15 is a system block diagram showing a marker flag circuit of the marker detection circuit.

FIGS. 13 through 15 respectively are system block diagrams showing an embodiment of the marker detection circuit 7. The marker detection circuit 7 includes a detection circuit 71 shown in FIG. 13, a burst counter circuit 72 shown in FIG. 14, and a marker flag circuit 73 shown in FIG. 15.

The detection circuit 71 includes flip-flops 701 and 702, a logical product (AND) circuit 703, an OR circuit 704, a JK flip-flop 705, a flip-flop 706, an AND circuit 707, and an inverter circuit 708 which are connected as shown in FIG. 13. The clock signal CLOCK is input to clock input terminals CLK of the flip-flops 701, 702, 705 and 706. A demodulation command signal DEMOD-ON from the MPU 3 is input to a data input terminal D of the flip-flop 701, and a Q-output of the flip-flop 701 is input to a data input terminal D of the flip-flop 702 and the AND circuit 703. A *Q-output (/Q-output or Q-bar output) of the flip-flop 702 is input to the AND circuit 703.

The OR circuit 704 receives an output signal DEMOD-ON-EDGE of the AND circuit 703 and a signal XT-END, and an output signal of this OR circuit 704 is input to a terminal J of the flip-flop 705. An output signal MKR-FOUND of the marker flag signal 73 shown in FIG. 15 is input to a terminal K of this flip-flop 705, and a reset signal RESETZ is input to a clear bar terminal *CL of this flip-flop 705. For example, the reset signal RESETZ is input in response to a manipulation of a power supply reset button. An output signal MKR-SRC of the flip-flop 705 is input to a data input terminal D of the flip-flop 706 and the AND circuit 707. The reset signal RESETZ described above is input to a clear bar terminal *CL of the flip-flop 706. A signal MKR-SRC-EDGE is obtained from a Q-output of the flip-flop 706. In addition, a *Q-output of the flip-flop 706 is input to the AND circuit 707. An output signal MKR-SRC-EDGE of the AND circuit 707 is input to the burst counter circuit 72 shown in FIG. 14 and the inverter circuit 708, and an output signal MKR-SRC-EDGE-Z of the inverter circuit 708 is input to the marker flag circuit 73 shown in FIG. 15.

The burst counter circuit 72 includes OR circuits 711 and 712, a counter 713, and a comparator 714 which are connected as shown in FIG. 14. The OR circuit 711 receives the signals HI-DATA and DATA-EDGE from the slice circuit 64 and the ¼T detection circuit 65 of the level slice circuit 6, and outputs a signal NO-DATA-Z which is input to the OR circuit 712. This OR circuit 712 also receives the output signal MKR-SRC-EDGE of the AND circuit 707 of the detection circuit 71 shown in FIG. 13. The counter 713 has a clock input terminal CLK which receives the clock signal CLOCK, a terminal DT which is fixed to "0", a load terminal LD which receives an output signal of the OR circuit 712, a chip enable terminal CE which receives the Q-output MKR-SRC-D of the flip-flop 706 of the detection circuit 71 shown in FIG. 13, and a clear bar terminal *CL which receives the reset signal RESETZ. A Q-output of the counter 713 is input to the comparator 714 which also receives a value "9". An output signal BURST-EQ-9 of the comparator 714 is input to the marker flag circuit 73 shown in FIG. 15.

Accordingly, the counter 713 carries out a counting operation when the output signal HI-DATA of the slice circuit 64 of the level slice circuit 6 or the output signal DATA-EDGE of the ¼T detection circuit of the level slice circuit 6 has a high level, that is, when the output signal NO-DATA-Z of the OR circuit 711 has a high level, and counts a number of times the digital reproduced signal SGN-DATA is consecutively "0". If 8 consecutive "0"s are counted by the counter 713, a high-level signal BURST-EQ-9 is output from the comparator 714.

The marker flag circuit 73 includes a flip-flop 721, an OR circuit 722, and AND circuits 723 through 725 which are connected as shown in FIG. 15. The flip-flop 721 has a clock input terminal CLK which receives the clock signal CLOCK, a clear bar terminal *CL which receives the reset signal RESETZ, and a data input terminal D which receives an output signal of the AND circuit 724. A Q-output signal MKR-FLG of the flip-flop 721 is input to the OR circuit 722 and the AND circuit 725. The OR circuit 722 also receives an output signal of the AND circuit 723. An output signal of the OR circuit 722 is input to the AND circuit 724. This AND circuit 724 also receives the output signal MKR-SRC-EDGE-Z of the inverter circuit 708 of the detection circuit 71 shown in FIG. 13. The AND circuit 723 receives the Q-output signal MKR-SRC-D of the flip-flop 706 of the detection circuit 71 shown in FIG. 13 and the output signal BURST-EQ-9 of the comparator 714 of the burst counter circuit 72 shown in FIG. 14. The AND circuit 725 receives an output signal of the AND circuit 723 and the output signal MKR-FLG of the flip-flop 721, and a signal MKR-FOUND is output from the AND circuit 725.

The output signal MKR-FLG of the flip-flop 721 is a marker flag, and is provided to discriminate whether the burst of consecutive "0"s is the first time or the second time. The marker flag assumes a high level ("1") when the burst of the consecutive "0"s is detected for the first time. When the burst of the consecutive "0"s is detected in a state where the marker flag has the high level, a high-level marker detection signal MKR-FOUND is output from the AND circuit 725.

Figure 16:
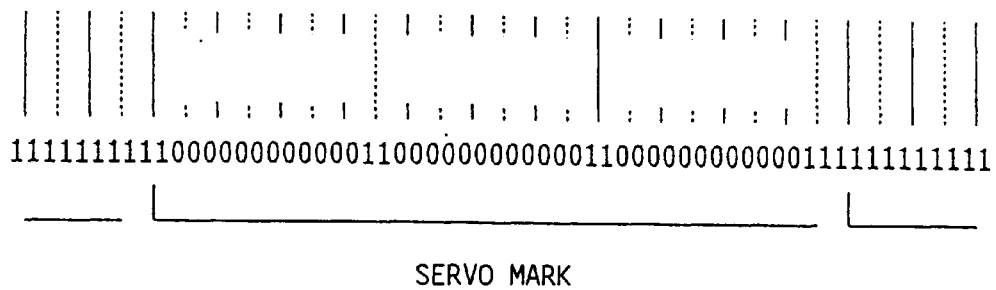
FIG. 16 is a diagram showing a servo mark pattern recorded on a disk.
Figure 17:
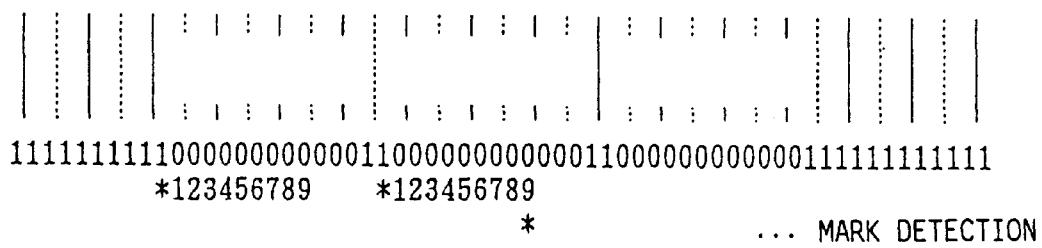
FIG. 17 is a diagram showing a case where the servo mark pattern shown in FIG. 16 is normally detected.

Therefore, according to this embodiment, if a servo pattern shown in FIG. 16 is recorded on the disk 100, the servo pattern is detected as shown in FIG. 17 in a normal case. In addition, even if a 1-bit dropout is generated as shown in FIG. 18 or, a data generation source is introduced as shown in FIG. 19, it is possible to correctly detect the servo mark pattern, and the access speed can be improved by preventing an unnecessary read retry operation and the like. In FIGS. 16 through 19, a broken line extending in the vertical direction indicates a peak of the S-pole, a solid line extending in the vertical direction indicates a peak of the N-pole, a symbol "*" appearing in front of "123456789" indicates a detected burst of consecutive "0"s, and a symbol "*" appearing below "9" indicates a time when the servo mark pattern is detected.

An interval in which the adder circuit 10 integrates the phase information in the servo region to demodulate the position information will hereinafter be referred to as an integrating interval. It is desirable that this integrating interval is as long as possible in order to improve the quality of the position signal by the averaging effect. However, if the integrating interval is set long, an upper limit (boundary) of a seek speed of the head 1 with respect to the disk 100 becomes low.

Figure 20:
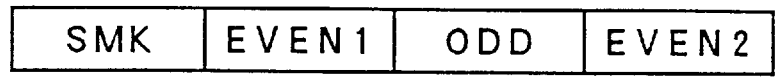
FIG. 20 is a diagram showing a servo mark region and a position region within the servo frame format with a gap region and the like omitted.
Figure 21:
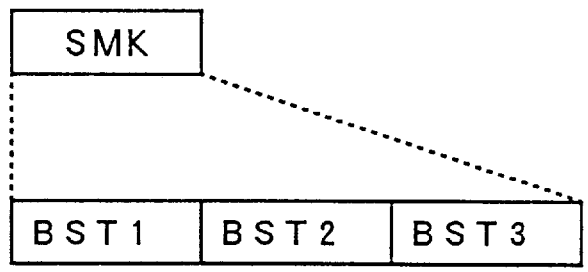
FIG. 21 is a diagram showing the structure of the servo mark region.
Figure 22:
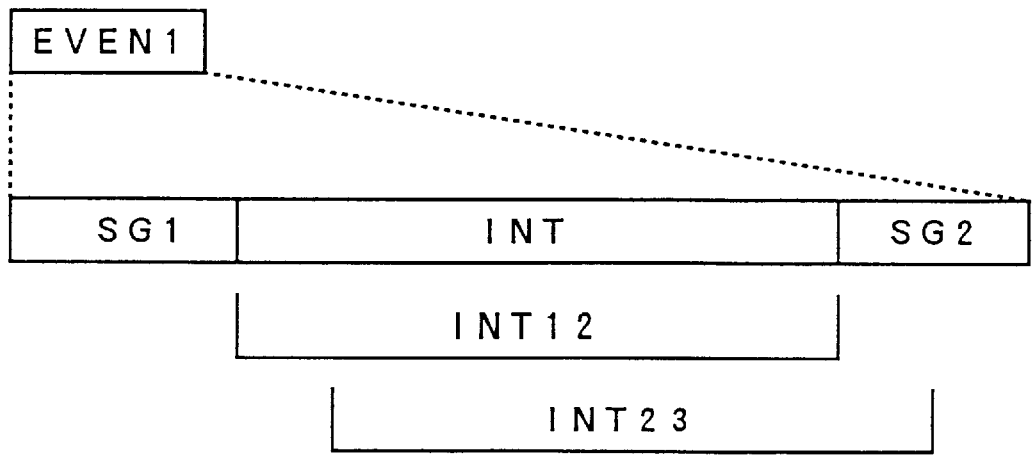
FIG. 22 is a diagram showing an integrating interval within the position region.

FIG. 20 is a diagram showing the servo mark region SMK and the position region POS within the servo frame format, with the gap region GAP and the like omitted. In addition, FIG. 21 is a diagram showing the structure of the servo mark region SMK which is made up of bursts BST1 through BST3 of "0"s. Furthermore, FIG. 22 is a diagram showing an integrating interval INT within the position region EVEN1 which is made up of a servo guard zones SG1 and SG2 and the integrating interval INT. The servo guard zone SG1 is provided to stabilize the operation of a lowpass filter (not shown) which is provided within the servo information demodulating circuit (A/D converter 4). On the other hand, the servo guard zone SG2 is provided to absorb a time redundancy of the servo mark pattern. The position regions ODD and EVEN2 have structures similar to that of the position region EVEN1.

When the servo mark pattern is detected at he bursts BST1 and BST2 of the servo mark region SMK, the integrating interval INT is set to a position indicated by INT12 in FIG. 22 in the position region EVEN1. In addition, when the servo mark pattern is detected at the bursts BST2 and BST3 of the servo mark region SMK, the integrating interval INT is set to a position indicated by INT23 in FIG. 22 in the position region EVEN1.

Figure 23:
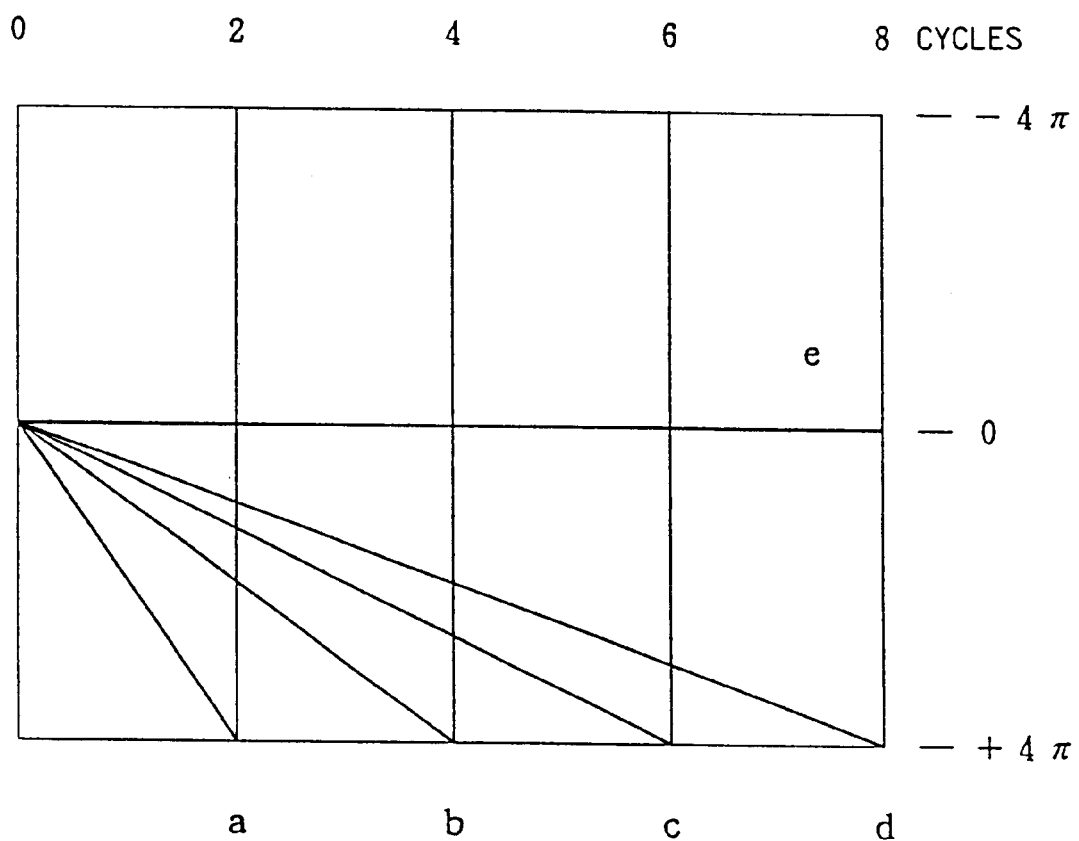
FIG. 23 is a diagram showing the relationship of the integrating interval and a position demodulation boundary speed.

FIG. 23 is a diagram showing the relationship of the integrating interval and a position demodulating boundary speed. In FIG. 23, d indicates the boundary speed for a case where a 8-period integration is carried out, and the boundary speed is reached at a minimum seek speed (slope). On the other hand, c, b and a indicate the boundary speeds which can be made large by reducing the integration period. Hence, in this embodiment, the integrating interval INT is changed depending on the seek speed so that it is possible to accurately detect the position even during the high-speed seek operation.

Figures 24A, 24B:
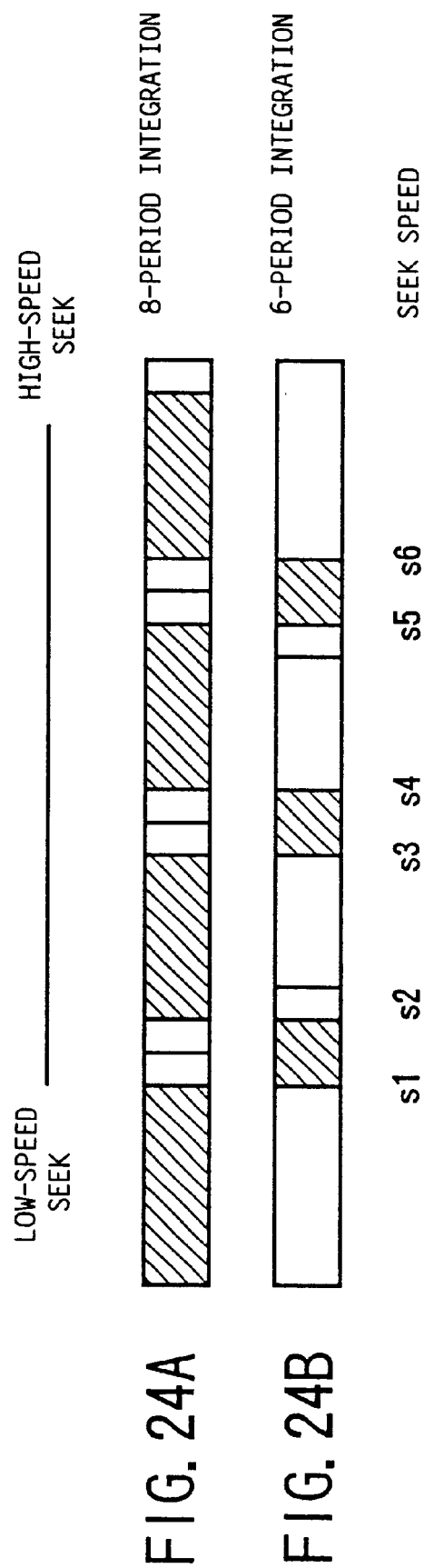
FIGS. 24A and 24B respectively are diagrams for explaining a case where an integration period is changed near the boundary speed in order to avoid the boundary speed.

FIGS. 24A and 24B respectively are diagrams for explaining a case where the integration period is changed near the boundary speed in order to avoid the boundary speed. FIG. 24A shows a case where a 8-period integration is carried out, and FIG. 24B shows a case where the integration period is changed near the boundary speed to a 6-period integration. In FIGS. 24A and 24B, the integrating interval INT is indicated by a hatching, and s1 through s6 indicate reference speeds which become references when changing the integration period.

Figure 25:
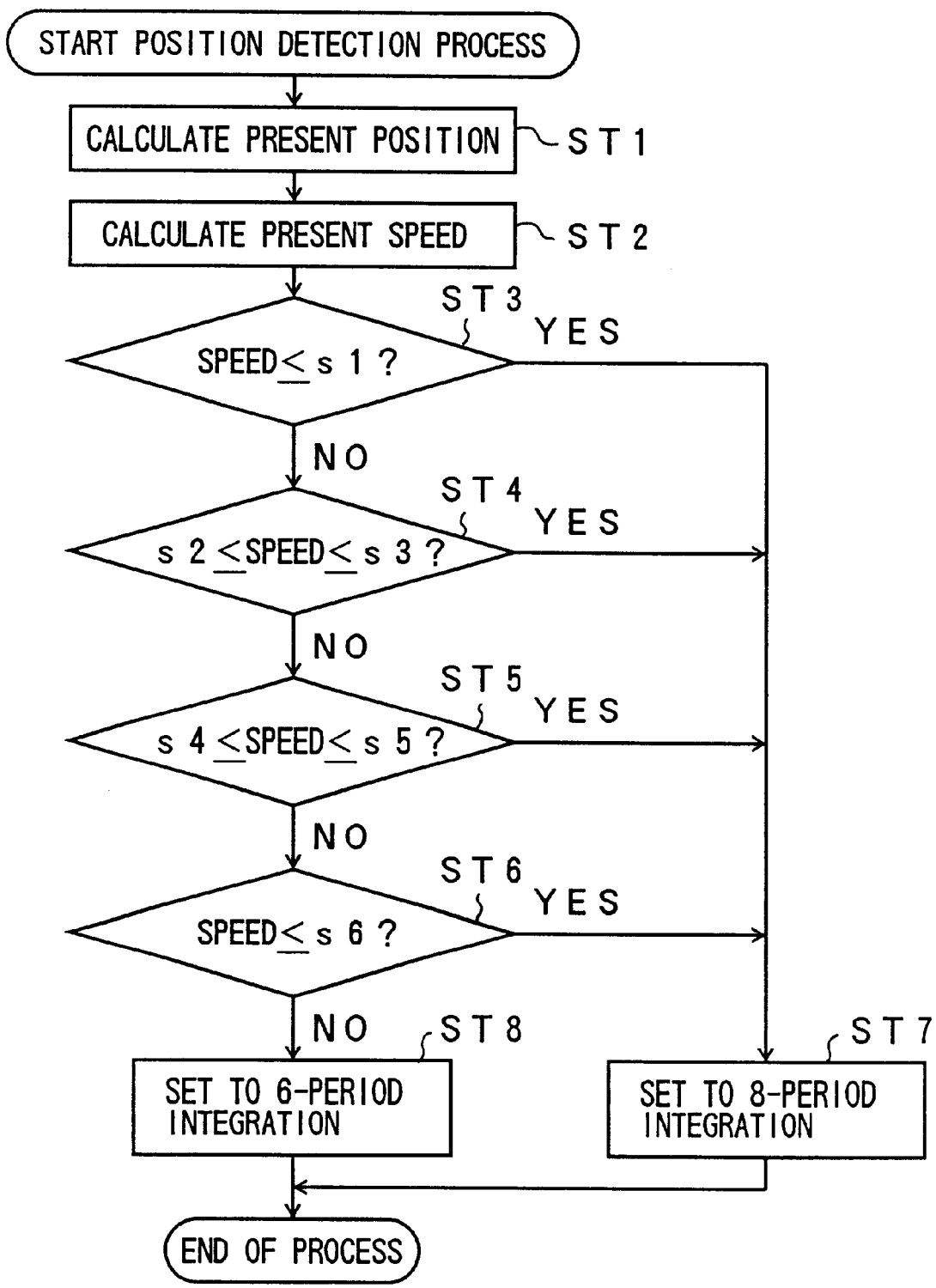
FIG. 25 is a flow chart for explaining the process of a MPU for changing the integrating interval depending on a seek speed.

FIG. 25 is a flow chart for explaining a Process of the MPU 3 for changing the integrating interval INT of the adder circuit 10 via the timing generating circuit 8 depending on the seek speed. In FIG. 25, when a position detection process is started, step ST1 calculates a position of the head 1 on the disk 100 based on the outputs of the register 11 and the Gray cylinder/head sector detection circuit 9. A step ST2 calculates a present seek speed. A step ST3 decides whether or not the present seek speed is less than or equal to the reference speed s1. If the decision result in the step ST3 is NO, a step ST4 decides whether or not the present seek speed is greater than or equal to the reference speed s2 and is less than or equal to the reference speed s3. If the decision result in the step ST4 is NO, a step ST5 decides whether or not the present seek speed is greater than or equal to the reference speed s4 and is less than or equal to the reference speed s5. If the decision result in the step ST5 is NO, a step ST6 decides whether or not the present seek speed is less than or equal to the reference speed s6. If the decision result in the step ST3, ST4, ST5 or ST6 is YES, a step ST7 sets the integration period to the 8-period integration, and the process ends. On the other hand, if the decision result in the step ST6 is NO, a step ST8 sets the integration period to the 6-period integration, and the process ends. As a result, the MPU 3 can instruct the set integration period with respect to the servo information demodulating circuit (adder circuit 10).

FIGS. 26A and 26B respectively are diagrams for explaining another method of setting the integration period. FIG. 26A shows a case where the 8-period integration is carried out, and FIG. 26B shows a case where the integration period is changed to the 6-period integration period when the seek speed increases to a predetermined speed. In FIGS. 26A and 26B, the integrating interval INT is indicated by a hatching.

Figures 27A, 27B, 27C, 27D:
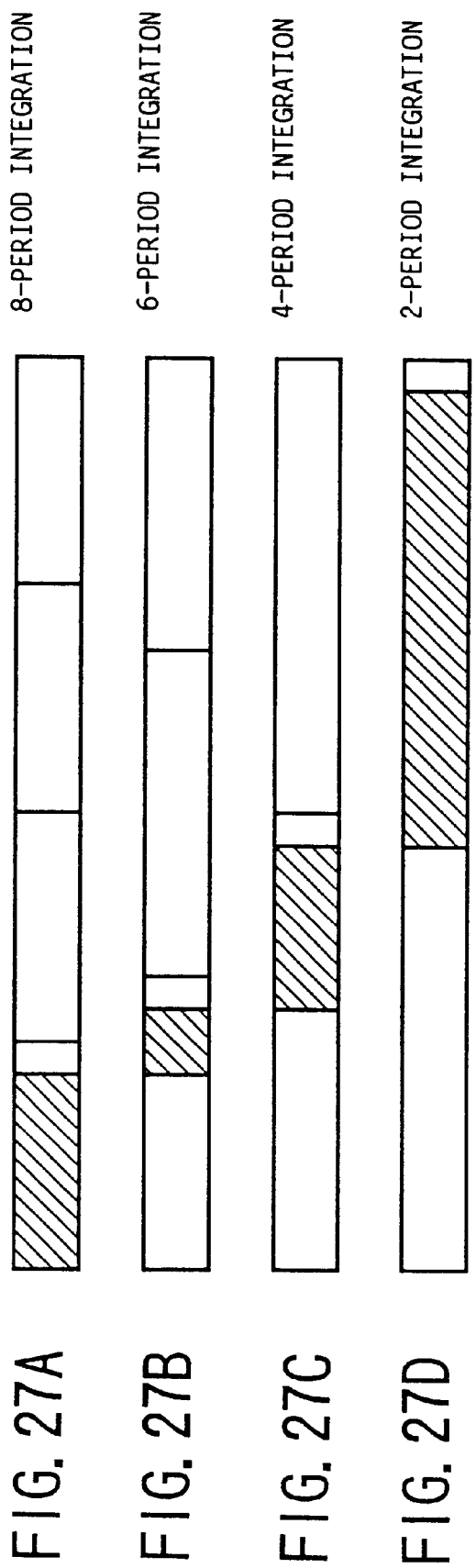
FIGS. 27A through 27D respectively are diagrams for explaining still another method of setting the integration period.

FIGS. 27A through 27D respectively are diagrams for explaining still another method of setting the integration period. FIG. 27A shows a case here the 8-period integration is carried out, FIG. 27B hows a case where the integration period is changed to the 6-period integration when the seek speed increases to a first predetermined speed, FIG. 27C shows a case where the integration period is changed to the 4-period integration when the seek speed increases to a second predetermined speed, and FIG. 27D shows a case where the integration period is changed to the 2-period integration when the seek speed increases to a third predetermined speed. In this case, the first predetermined speed is smaller than the second predetermined speed, and the second predetermined speed is smaller than the third predetermined speed. In FIGS. 27A through 27D, the integrating interval INT is indicated by a hatching.

The information such as the Gray code recorded within the servo frame must be read by use of a clock signal which is not synchronized to the signal read from the disk 100. The consecutive "0"s are the condition for starting the reading of the Gray code, but when reading a long signal, timings of the clock signal and the data gradually become a synchronized to each other. Hence, in this embodiment, consecutive "0"s are recorded for every specific number of bits, and the synchronization is achieved with respect to the consecutive "0"s so as to prevent the timings of the clock signal and the data from becoming a synchronized. More particularly, the synchronization of the clock signal and the data is maintained by copying data between a counter which counts the number of "0"s and a counter which determines the data read position.

Figure 28:
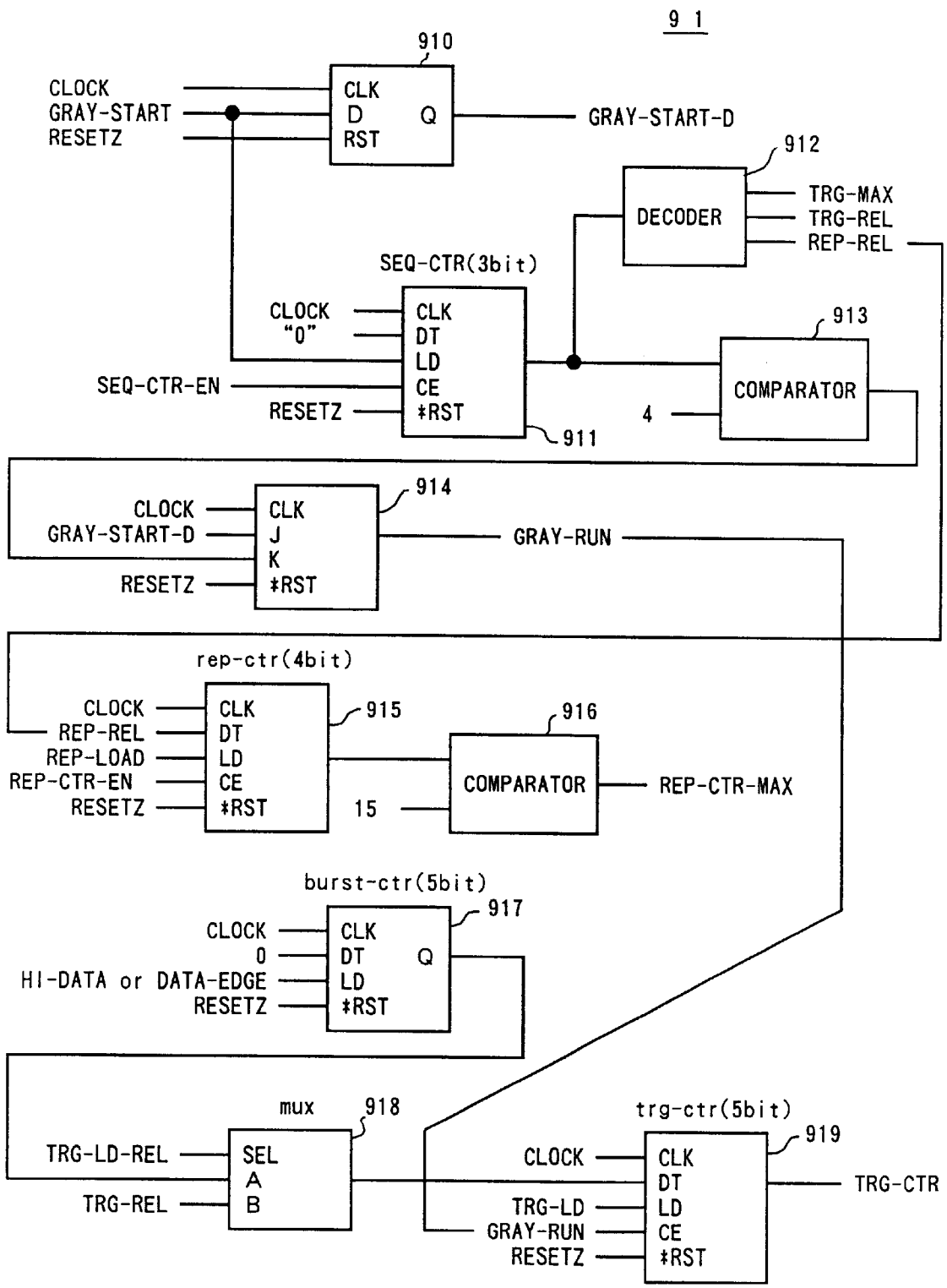
FIG. 28 is a system block diagram showing a part of a Gray cylinder/head sector detection circuit.
Figure 29:
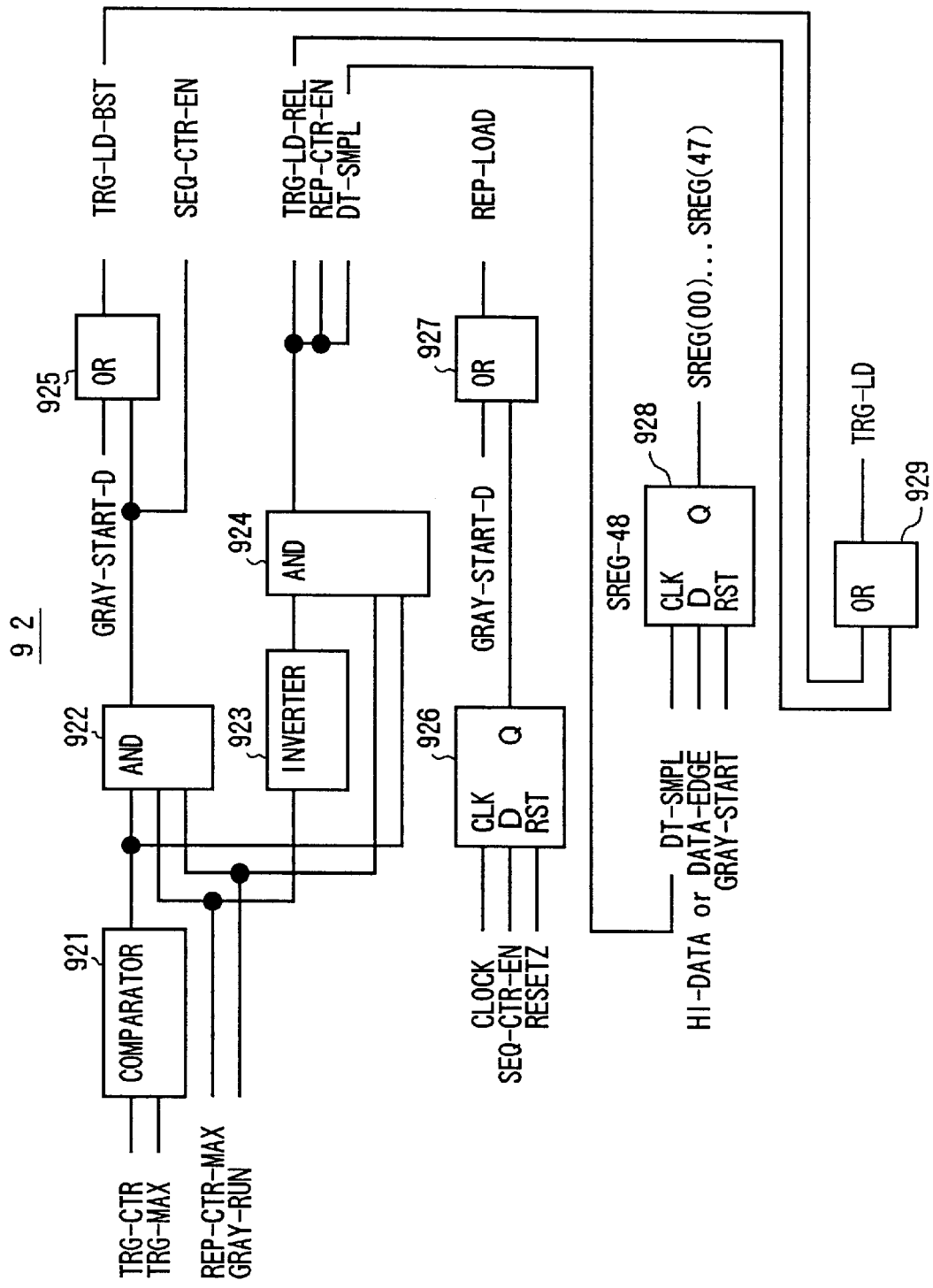
FIG. 29 is a system block diagram showing another part of the Gray cylinder/head sector detection circuit.

FIG. 28 is a system block diagram showing a part of the Gray cylinder/head sector detection circuit 9, and FIG. 29 is a system block diagram showing another part of the Gray cylinder/head sector detection circuit 9.

A circuit part 91 of the Gray cylinder/head sector detection circuit 9 includes a flip-flop 910, a sequence counter 911 for counting a sequence "0" to "3", a decoder 912, a comparator 913, a JK flip-flop 914, a repetition counter 915 for determining a number of bits to be entered, a comparator 916, a burst counter 917 for counting the number of "0"s, a selector 918, and a trigger counter 919 for entering "0"s/"1"s which are connected as shown in FIG. 28. On the other hand, a circuit part 92 of the Gray cylinder/head sector detection circuit 9 includes a comparator 921, an AND circuit 922, a inverter circuit 923, an AND circuit 924, an OR circuit 925, a flip-flop 926, an OR circuit 927, a flip-flop 928, and an OR circuit 929 which are connected as shown in FIG. 29.

In FIG. 28, the clock signal CLOCK is input to clock input terminals CLK of the flip-flops 910 and 914 and to clock input terminals CLK of the counters 911, 915, 917 and 919. In addition, the reset signal RESETZ is input to a reset terminal RST of the flip-flop 910, a reset terminal *RST of the flip-flop 914, and reset terminals *RST of the counters 911, 915, 917 and 919. A signal GRAY-START from the timing generating circuit 9 shown in FIG. 1 and indicating the detection start timing is input to a data input terminal D of the flip-flop 910 and a load terminal LD of the counter 911. This signal GRAY-START assumes a high level during 1 clock approximately at an intermediate portion of the Gray code sync. A Q-output GRAY-START-D of the flip-flop 910 is input to a terminal J of the flip-flop 914 and the OR circuit 925 of the circuit part 92 shown in FIG. 29.

The counter 911 has a terminal DT which receives a signal fixed to "0", and a chip enable terminal CE which receives an output signal SEQ-CTR-EN of the AND circuit 922 of the circuit part 92 shown in FIG. 29. An output signal of the counter 911 is input to the decoder 912 and the comparator 913, and signals TRG-MAX, TRG-REL and REP-REL are output from the decoder 912. The signal TRG-MAX indicates a maximum value of the trigger counter 919, the signal TRG-REL indicates a load value of the trigger counter 919, and the signal REP-REL indicates the number of bits.

The comparator 913 also receives a signal having a value "4", and an output signal of the comparator 913 is input to a terminal K of the flip-flop 914.

The counter 915 has a terminal DT which receives the output signal REP-REL of the decoder 912, a load terminal LD which receives an output signal REP-LOAD of the OR circuit 927 of the circuit part 92 shown in FIG. 29, and a chip enable terminal CE which receives an output signal REP-CTR-EN of the AND circuit 924 of the circuit part 92 shown in FIG. 29. An output signal GRAY-RUN of the flip-flop 914 is input to a chip enable terminal CE of the counter 919. An output signal of the counter 915 is input to the comparator 916 which also receives a signal having a value "15", and an output signal REP-CTR-MAX of the comparator 916 is input to the AND circuit 922 and the inverter circuit 923 of the circuit part 92 shown in FIG. 29.

The counter 917 has a terminal DT which receives a signal having a value "0", and a load terminal LD which receives the output signal HI-DATA of the OR circuit 613 shown in FIG. 11 or the output signal DATA-EDGE of the OR circuit 617 shown in FIG. 12. An output signal of the counter 917 is input to a terminal A of the selector 918. The selector 918 has a terminal B which receives the output signal TRG-REL of the decoder 912, and a selector terminal SEL which receives an output signal TRG-LD-SEL of the AND circuit 924 of the circuit part 92 shown in FIG. 29. An output signal of the selector 918 is input to a terminal DT of the counter 919. An output signal TRG-LD of the OR circuit 929 of the circuit part 92 shown in FIG. 29 is input to a load terminal LD of the counter 919, and an output signal TRG-CTR of this counter 919 is input to the comparator 921 of the circuit part 92 shown in FIG. 29.

In FIG. 29, the comparator 921 receives the signals TRG-CTR and TRG-MAX from the circuit part 91 shown in FIG. 28, and an output signal of this comparator 921 is input to the AND circuits 922 and 924. The AND circuits 922 and 924 also receive the signal GRAY-RUN from the circuit part 91. The signal REP-CTR-MAX from the circuit part 91 is input directly to the AND circuit 922, and to the AND circuit 924 via the inverter circuit 923. An output signal SEQ-CTR-EN of the AND circuit 922 is input to the OR circuit 925 and a data input terminal D of the flip-flop 926, and the signal GRAY-START-D from the circuit part 91 is also input to the OR circuit 925. An output signal TRG-LD-BST of the OR circuit 925 is input to the OR circuit 929. In addition, signals TRG-LD-REL, REP-CTR-EN and DT-SMPL are output from the AND circuit 924. The signal TRG-LD-REL is input to the OR circuit 929, and the signal DT-SMPL is input to a clock input terminal CLK of the flip-flop 928.

The flip-flop 926 has a clock input terminal CLK which receives the clock signal CLOCK, and a reset terminal RST which receives the reset signal RESETZ. A Q-output of the flip-flop 926 is input to the OR circuit 927 which also receives the signal GRAY-START-D from the circuit part 91. An output signal of the OR circuit 927 is input to the load terminal LD of the counter 915 of the circuit 91. The output signal HI-DATA of the OR circuit 613 shown in FIG. 11 or the output signal DATA-EDGE of the OR circuit 617 shown in FIG. 12 is input to a data input terminal D of the flip-flop 928. In addition, the signal GRAY-START is input to a reset terminal RST of the flip-flop 928. Signals SREG(00), . . . , SREG(47) indicating the serial Gray code to be input to the MPU 3 are obtained from a Q-output of the flip-flop 928. The output signal TRG-LD. of the OR circuit 929 is input to the load terminal LD of the counter 919 of the circuit part 91.

FIGS. 30 through 32 respectively are timing charts showing timings of signals at various parts of the circuit parts 91 and 92 shown in FIGS. 28 and 29. In addition, FIG. 33 is a diagram for explaining the Gray code sync. In FIGS. 30 through 32, those signals which are the same as those corresponding signals in FIGS. 28 and 29 are designated by the same reference numerals. In FIG. 33, G-SYNC indicates a Gray code sync, G indicates a Gray code (14 bits), H indicates a head number (5 bits), S indicates a sector number (7 bits), and P indicates a parity.

In this embodiment, the data "1" recorded in the Gray code is represented by a pattern "0000000001", and the data "0" is represented by a pattern "0101010101". A sync zone of the Gray code is detected from 14 consecutive "0"s. In addition, a pattern "0101010101" of the sync zone is made to correspond to the bit "0", and a pattern "0000000001" of the sync zone is made to correspond to the bit "1". A pattern "01010101" of the head sector is made to correspond to the bit "0", and the pattern "0000000001" of the head sector is made to correspond to the bit "1".

Accordingly, in the circuit parts 91 and 92 shown in FIGS. 28 and 29, the burst counter 917 counts the number of consecutive "0"s, and the trigger counter 919 determines the timing with which the data is entered. The burst counter 917 is loaded with "0" every time a digital reproduced signal waveform is generated, and the burst counter 917 otherwise counts up. Hence, the burst counter 917 always counts the number of consecutive "0"s.

Since the input data and the clock signal CLOCK are not synchronized to each other, the timing relationship of the input data and the clock signal CLOCK gradually becomes asynchronous. The sync zone of the Gray code is provided to prevent this gradually asynchronization and to synchronize the input data and the clock signal CLOCK. The bit "1" (pattern "0000000001") is recorded in the sync zone of the Gray code for the purposes of correcting the phase error between the input data and the clock signal CLOCK.

The trigger counter 919 measures a location which is thought to be a center of the sync zone, and loads the value of the burst counter 917 to the trigger counter 919 at this location. As a result, a value which is "1" smaller than the value of the burst counter 917 is loaded into the burst counter 919, but the trigger counter 919 can be synchronized to the burst counter 919. The trigger counter 919 and the input data can be synchronized because the burst counter 917 is synchronized to the input data.

Figure 34:
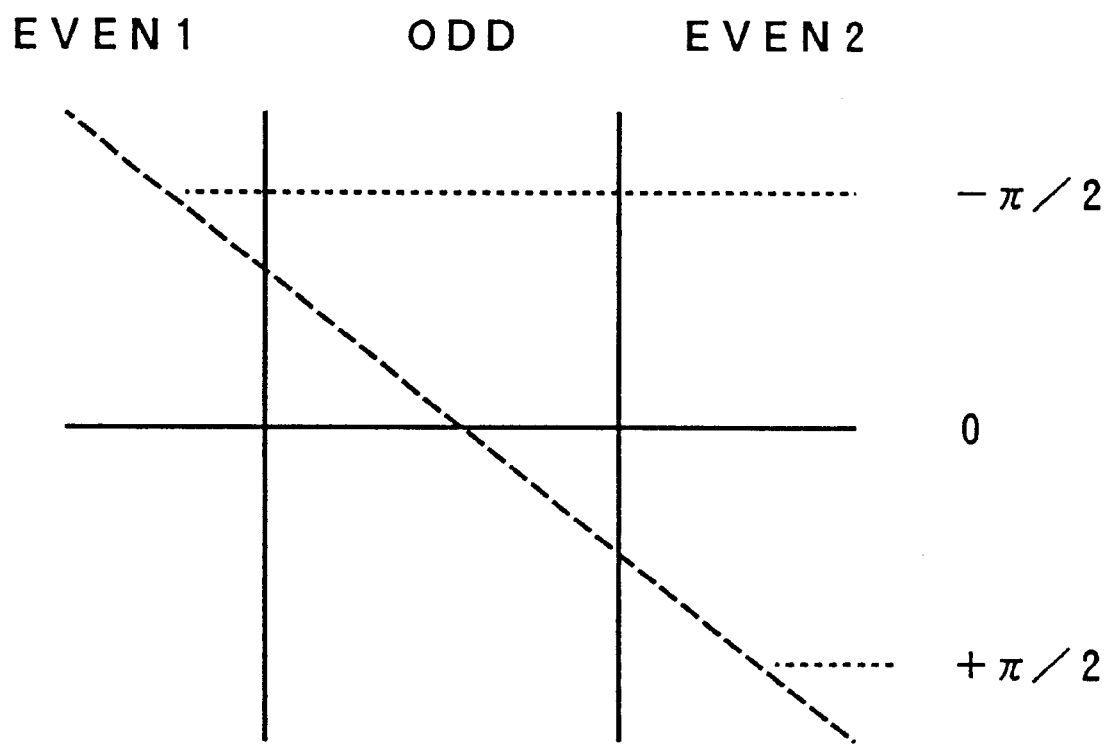
FIG. 34 is a diagram showing a scanning locus of a head by a broken line when the head moves 90° between position regions EVEN1 and ODD.

During a seek operation, a scanning angle of the head 1 which scans the position regions EVEN1 and EVEN2 may become different from the phase at a center. between the position regions EVEN1 and EVEN2. FIG. 34 is a diagram showing a scanning locus of the head 1 by a broken line for a case where the head 1 moves 90° ($\pi/2$ radians) from the position region EVEN1 to the position region ODD. In this case, since the head 1 moves about 0° as the center, the phase at the center between the position regions EVEN1 and EVEN2 can be obtained by simply adding the phases at the position regions EVEN1 and EVEN2 and dividing a sum of the phases by 2. However, in a case where 0° is not the center, the moving speed of the head 1 is large or the like, the phase at the center between the position regions EVEN1 and EVEN2 cannot be obtained from a simple averaging.

For example, in a case where the scanning angle of the head 1 which scans the position regions EVEN1, ODD and EVEN2 in this order changes from 0°, 180° and 0° in this order, the phase at the center between the position regions EVEN1 and EVEN2 becomes 0° if the phase at the center is obtained from the simple averaging, but the correct phase at the center is actually 180° in this particular case. In order to correct this error in the phase at the center, it is necessary to subtract a moved amount of the head 1 from the average which is obtained from the simple averaging, and to convert a subtracted result to the phase at the center position. In the particular case described above, it is necessary to add a moved amount of 180° to the phase at the position region EVEN1 and to subtract a moved amount of 180° from the phase at the position region EVEN2. In other words, if the head moving speed is greater than a predetermined value, it is necessary to carry out the phase calculation by taking the head moving speed into consideration, and in this embodiment, the correct phase at the center position is calculated by the following method.

The MPU 3 shown in FIG. 1 can detect the head moving speed from a previous position of the head 1 and a position of the head 1 prior to the previous position, by use of a known method. For example, if the sampling interval of the head position is several tens of $\mu$sec, the head moving speed remains virtually unchanged between 2 successive sampling points, and for this reason, the head moving speed can be detected in the above described manner. In addition, since the servo mark pattern is peculiar to the disk unit, the phase to be corrected can easily be calculated from the head moving speed and the length of the servo pattern. In other words, a phase conversion process during the seek operation is carried out by the MPU 3. The MPU 3 reads the phase information stored in the register 11, and calculates the phase with respect to the position regions EVEN1, ODD and EVEN2, and calculates the final phase.

Figure 35:
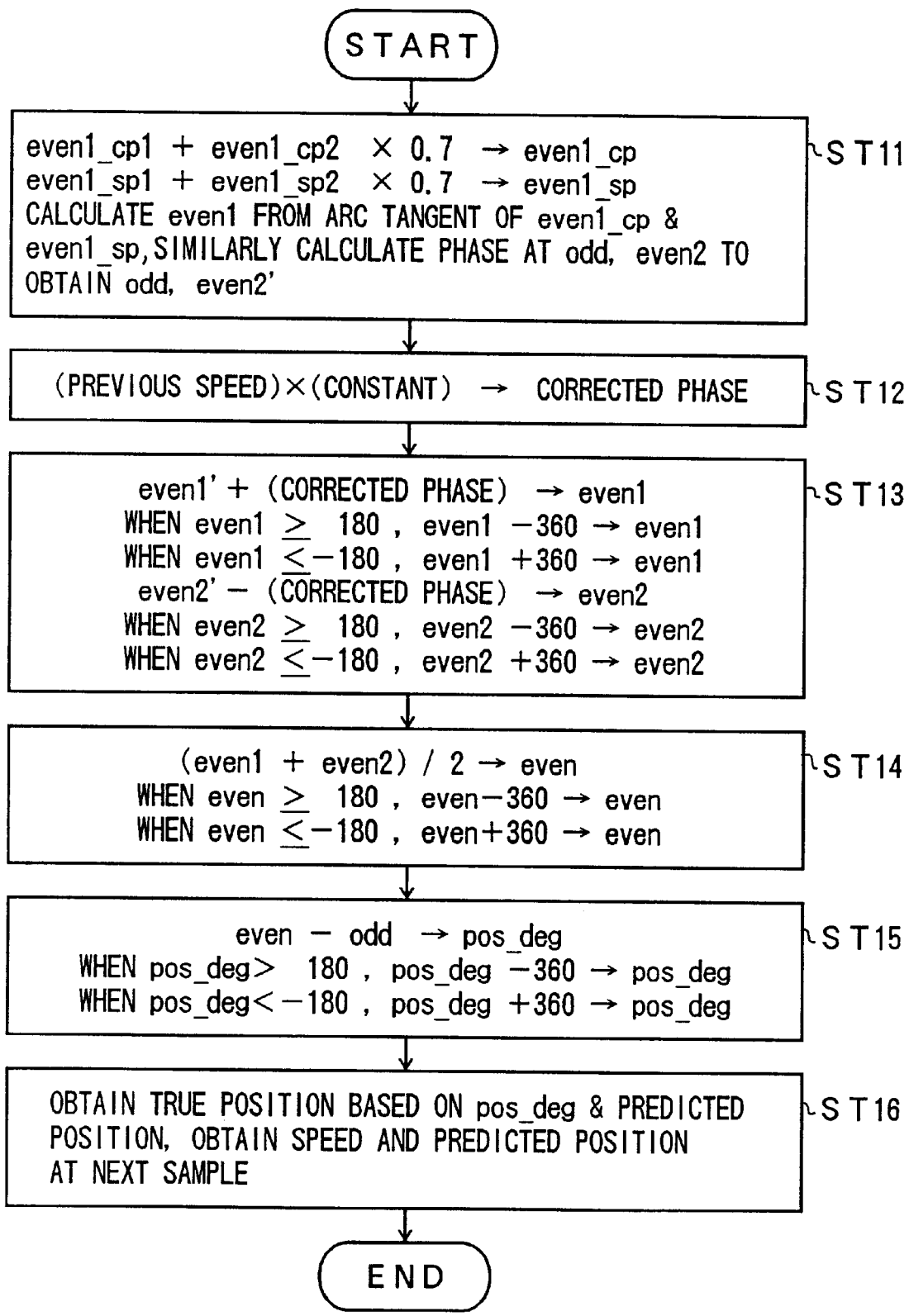
FIG. 35 is a flow chart for explaining a phase conversion process carried out by the MPU during a seek operation.

FIG. 35 is a flow chart for explaining the phase conversion process carried out by the MPU 3 during the seek operation. In FIG. 35, a step ST11 obtains phases "even 1'", "odd" and "even 2'" at the position regions EVEN1, ODD and EVEN2 by carrying out the following calculations based on phase information cp1, cp2, sp1 and sp2 read from the register 11, where cp1+cp2/$\sqrt{2}$=cp (cosine component of the digital Fourier transform (DFT), and sp1+sp2/$\sqrt{2}$=sp (sine component of the DFT). First, even1__cp1+even1__cp2×0.7 is set to even1__cp, and even1__1sp1+even1__sp2×0.7 is set to even1__sp. Then, the phase "even1'" is calculated from an arc tangent of even1__cp and even__sp, and the phases "odd" and "even2'" are calculated by carrying out similar calculations.

A step ST12 multiplies a constant to the previous moving speed of the head 1 and obtains a corrected phase. A step ST13 calculates the "even1" from a sum of the phase "even1'" and the corrected phase, and resets "even1−360" to "even1" if "even1" is greater than or equal to 180 and resets "even1+360" to "even1" if "even1" is less than or equal to −180. In addition, the step ST13 calculates "even2" by subtracting the corrected phase from "even2'", and resets "even2+360" to "even2" if "even2" is greater than or equal to 180 and resets "even2+360" to "even2" if "even2" is less than or equal to −180.

A step ST14 calculates "even" from (even1+even2)/2, and resets "even−360" to "even" if "even" is greater than or equal to 180 and resets "even+360" to "even" if "even" is less than or equal to −180. In addition, a step ST15 calculates pos__deg from "even−odd", and resets "pos__deg−360" to "pos__deg" if "pos__deg" is greater than or equal to 180, an resets "pos__deg+360" to "pos__deg" if "pos__deg" is less than or equal to 180. A step ST16 obtains the true position of the head 1 on the disk 100 based on "pos__deg" and a predicted position with respect to the present sampling point, and obtains the head moving speed and a predicted position at the next sampling point.

According to the phase conversion process shown in FIG. 35, an erroneous position detection during the seek operation is prevented by using the head moving speed obtained by the MPU 3 when demodulating the servo information.

Figure 36A:
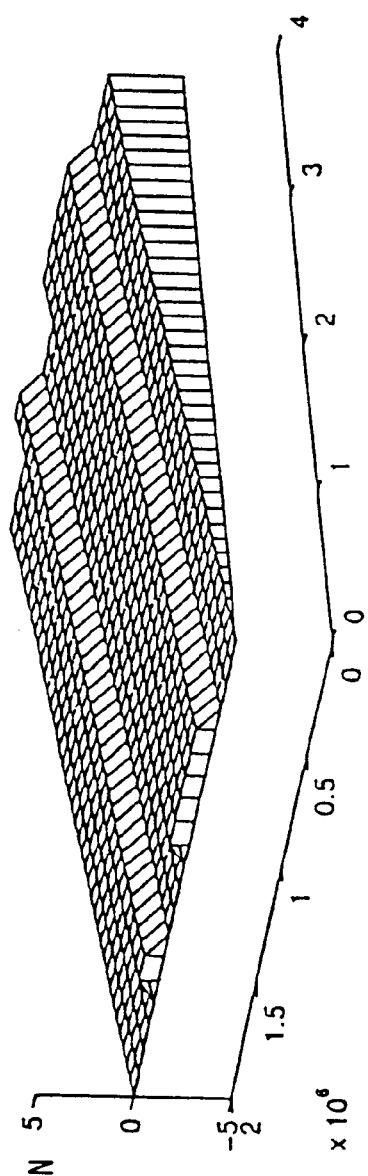
FIGS. 36A and 36B respectively are diagrams showing a demodulation error in a case where the servo information is demodulated without taking a seek speed into consideration.
Figure 36B:
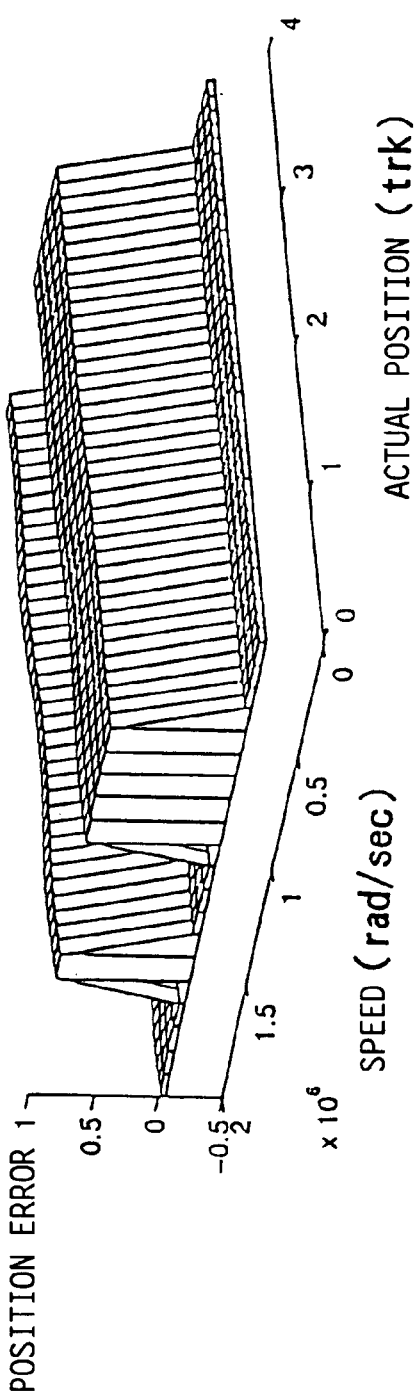

FIGS. 36A and 36B respectively are diagrams showing a demodulation error in a case where the servo information is demodulated without taking a seek speed (head moving speed) into consideration. More particularly, FIG. 36A shows the relationship of the detected position and the seek speed, and FIG. 36B shows the relationship of the error between the detected position and the actual position and the seek speed.

Figure 37A:
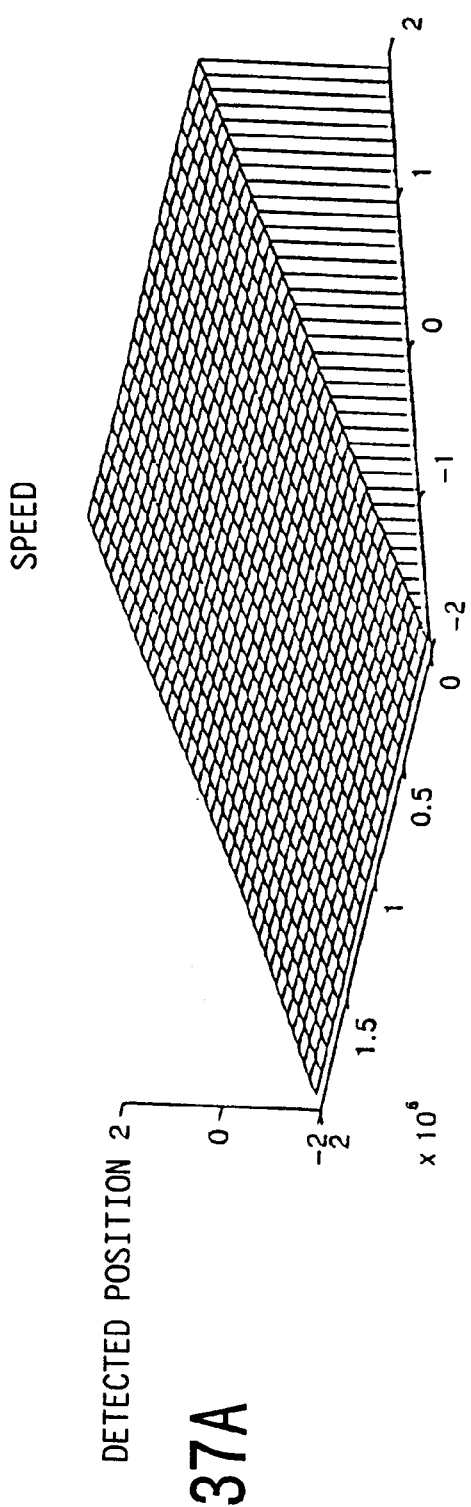
FIGS. 37A and 37B respectively are diagrams showing a demodulation error in a case where the servo information is demodulated by taking the seek speed into consideration.
Figure 37B:
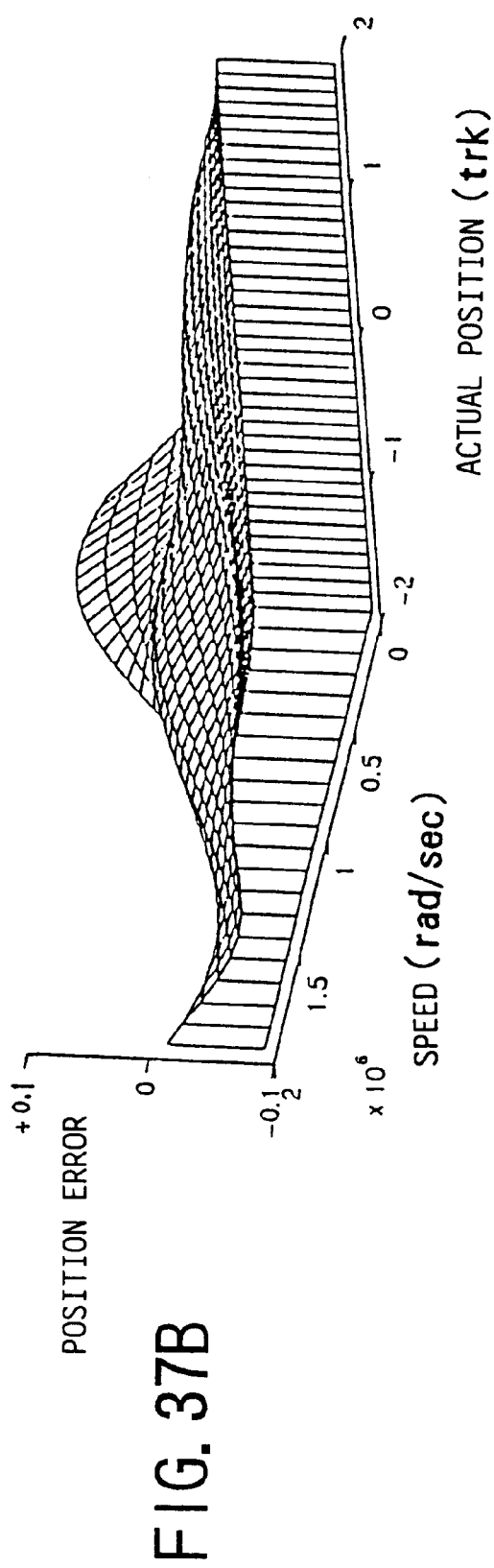

In addition, FIGS. 37A and 37B respectively are diagrams showing a demodulation error in a case where the servo information is demodulated by taking the seek speed (head moving speed) into consideration as in-this embodiment. More particularly, FIG. 37A shows the relationship of the detected position and the seek speed, and FIG. 37B shows the relationship of the error between the detected position and the actual position and the seek speed.

As may be seen by comparing FIGS. 37A and 37B with FIGS. 36A and 36B, it was confirmed that the servo information can be correctly demodulated by converting the phases at the position regions EVEN1 and EVEN2 into the phase at the center of the position region ODD by taking-the seek speed (head moving speed) into consideration.

In the phase conversion process shown in FIG. 35, the phase angles at the position regions EVEN1 and EVEN2 are obtained, and the correction is thereafter carried out with respect to the phase angles. For this reason, the division and arc tangent must be calculated with respect to the position regions EVEN1, ODD and EVEN2 a total of 3 times. Hence, a description will next be given of a phase calculation process which can reduce the load on the MPU 3 by reducing the calculations of the division and the arc tangent, by referring to FIG. 38.

Figure 38:
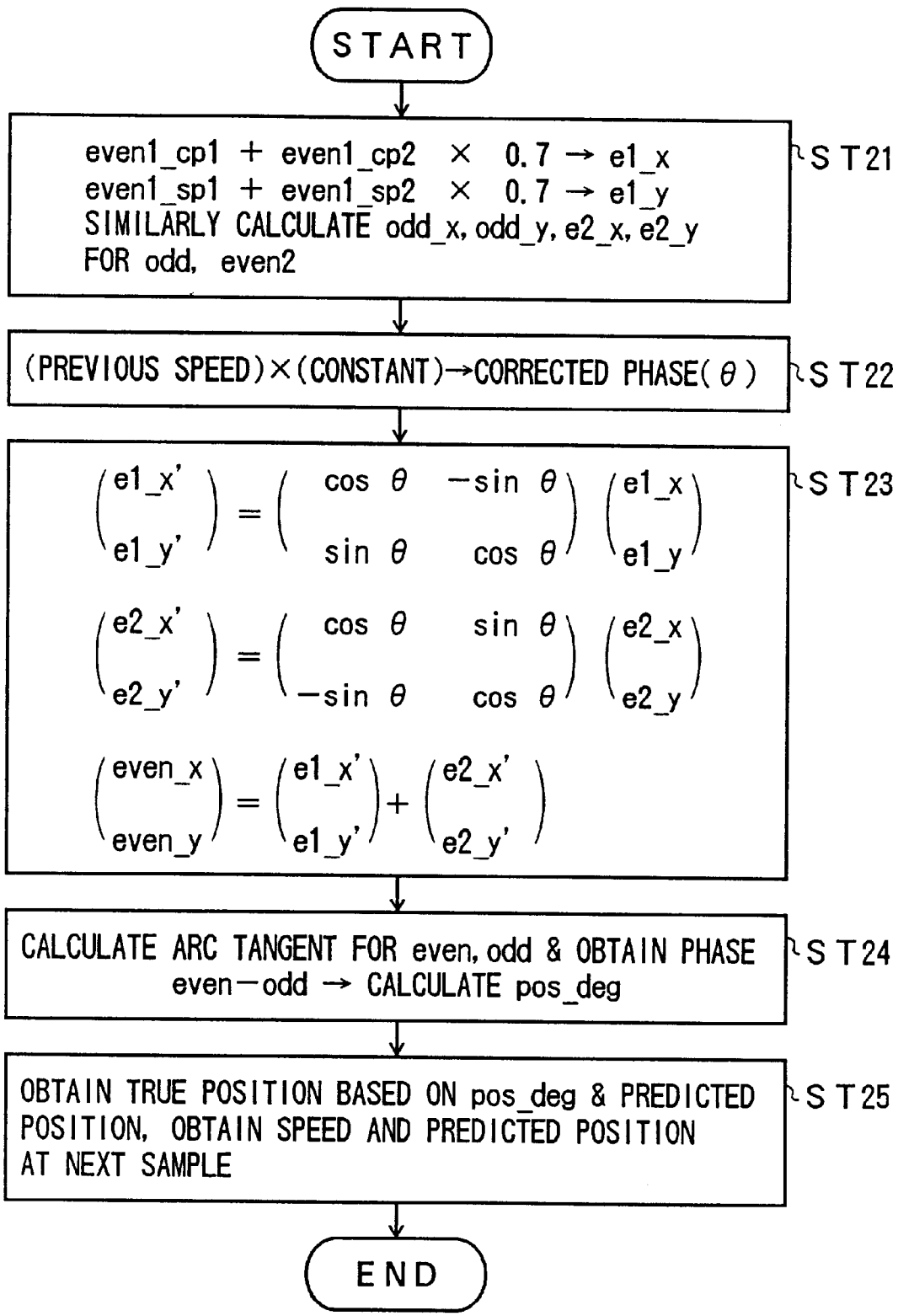
FIG. 38 is a flow chart for explaining a phase calculation process carried out by the MPU during the seek operation.

FIG. 38 is a flow chart for explaining the phase calculation process carried out by the MPU 3 during the seek operation. In FIG. 38, a step ST21 obtains vector components e1_x, e1_y, odd_x, odd_y, e2_x and e2_y of the phases at the position regions EVEN1, ODD and EVEN2 by carrying out the following calculations based on the phase information cp1, cp2, sp1 and sp2 read from the register 11. First, even1_cp1+even1_cp2×0.7 is set to e1_x, and even1_sp1+even1_sp2×0.7 is set to e1_y, where cp enotes a x-component of the vector information, and sp denotes a y-component of the vector information The step ST21 also calculates odd_x, odd_y, e2_x and e2_y by carrying out similar calculations.

A step ST22 multiplies a constant to the revious moving speed of the head 1 and obtains a corrected phase θ. A step ST23 carries out the following vector operations.

$$\begin{pmatrix} e1\_x' \\ e1\_y' \end{pmatrix} = \begin{pmatrix} \cos\theta & -\sin\theta \\ \sin\theta & \cos\theta \end{pmatrix} \begin{pmatrix} e1\_x \\ e1\_y \end{pmatrix} \quad (1)$$

$$\begin{pmatrix} e2\_x' \\ e2\_y' \end{pmatrix} = \begin{pmatrix} \cos\theta & \sin\theta \\ -\sin\theta & \cos\theta \end{pmatrix} \begin{pmatrix} e2\_x \\ e2\_y \end{pmatrix} \quad (2)$$

$$\begin{pmatrix} even\_x \\ even\_y \end{pmatrix} = \begin{pmatrix} e1\_x' & e2\_x' \\ e1\_y' & e2\_y' \end{pmatrix} \quad (3)$$

The position region EVEN1 and the position region EVEN2 have the same vector information if the seek speed is 0. However, according to the method which adds the vector information of the position regions EVEN1 and EVEN2 and divides a sum by 2, the phase differs by 180° if 2 cylinders are seeked between the position region EVEN1 and the position region EVEN2, and in this case, 2 kinds of intermediate vectors exist and it cannot be determined which phase is to be selected.

Hence, in this embodiment, the phases at the position regions EVEN1 and EVEN2 are converted into the phase at the center of the position region ODD. The MPU 3 can obtain the approximate head moving speed from the previous position of the head 1 and the position of the head 1 prior to the previous position. In addition, the MPU 3 can obtain in advance a distance between the-centers of the position region EVEN1 and the position region ODD. For this reason, it is possible to calculate the moving angle of the head 1 at the center between the position regions EVEN1 and ODD, and when this moving angle is denoted by θ, this moving angle θ can be represented by θ=(head moving speed)*(constant), where "*" denotes a multiplication. Since the phase information of the position regions EVEN1 and EVEN2 which is obtained by demodulating the servo information is advanced or lags the phase angle at the center of the position region ODD by θ, it is possible to correct the vector component by the vector operations (1) and (2) described above. By carrying out the vector operations (1) and (2), the directions of the vectors in the position regions EVEN1 and EVEN2 become the same, and it becomes possible to carry out the addition described by the vector operation (3) described above.

A step ST24 calculates "pos_deg" from "even–odd", and obtains the phase by calculating the arc tangent with respect to "even" and "odd". In addition, a step ST25 obtains the true position of the head 1 on the disk 100 based on "pos_deg" and the predicted position, and obtains the head moving speed and the predicted position at the next sampling point.

Therefore, according to the phase calculation process shown in FIG. 38, it is possible to correct the phase depending on the seek speed in the vector form without having to convert the vector information into the angle information, and the phase at the center position between the position regions EVEN1 and EVEN2 can be obtained by adding the phase correction results with respect to the position regions EVEN1 and EVEN2 as they are in the vector form. In this case, compared to the phase conversion process shown in FIG. 35, it is possible to reduce the number of calculations of the arc tangent to 2. In addition, in the case of the vector operation, no boundary exists at ±180° as in the case of the operation carried out with respect to the angle, and thus, the conditional decisions can be reduced as compared to the phase conversion process shown in FIG. 35. As a result, the phase calculation process shown in FIG. 38 can reduce the amount of calculation and calculation time required by the phase conversion process shown in FIG. 35, thereby making it possible to reduce the load on the MPU 3.

According to the phase calculation process shown in FIG. 38, the arc tangent must be calculated 2 times. Hence, a description will now be given of a phase calculation process which reduces the number of calculations of the arc tangent by carrying out a sum-of-products operation, so as to further reduce the load on the MPU 3, by referring to FIG. 39.

Figure 39:
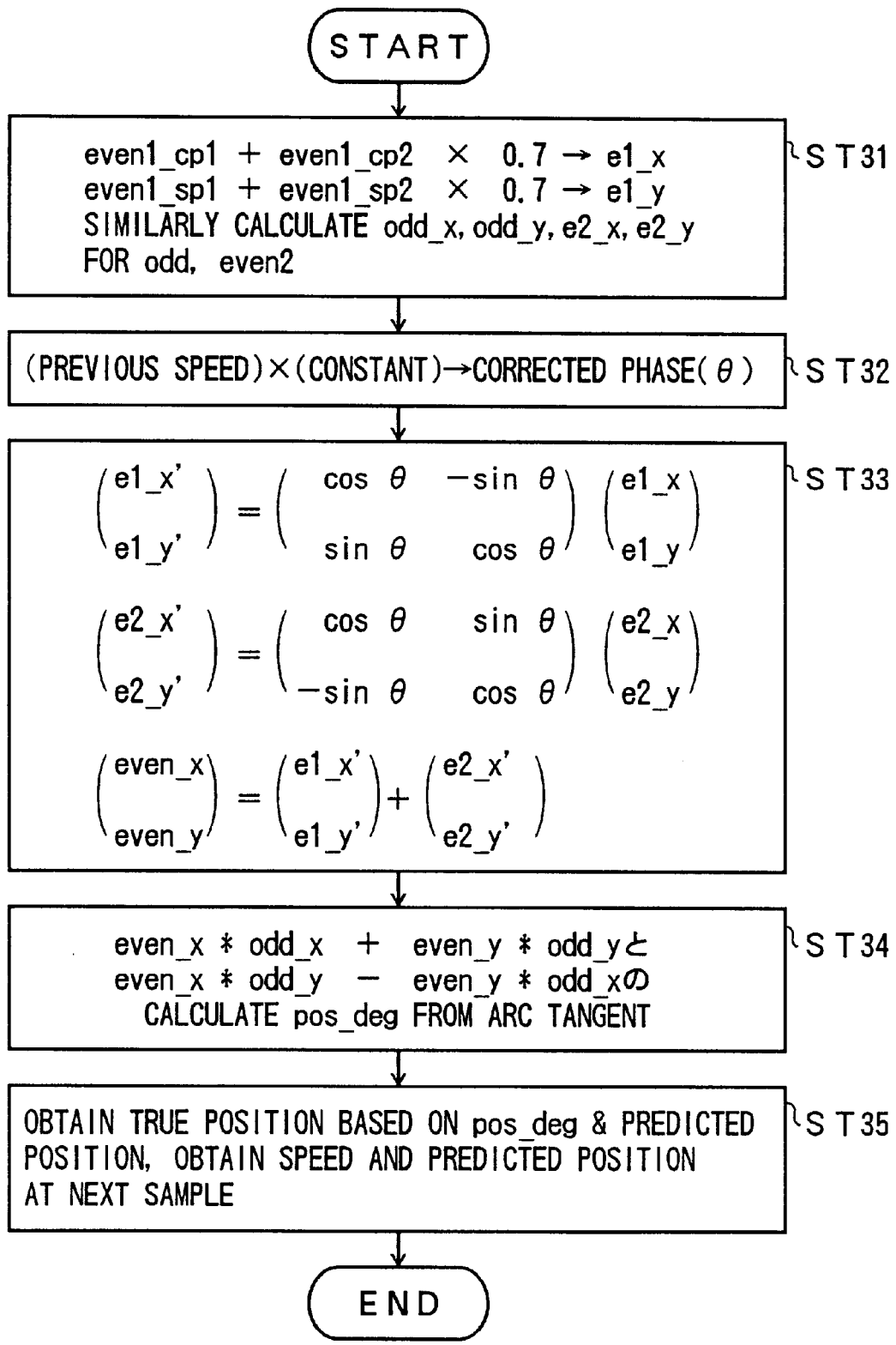
FIG. 39 is a flow chart for explaining a phase calculation process carried out by the MPU during the seek operation.

FIG. 39 is a flow chart for explaining the phase calculation process carried out by the MPU 3 during the seek operation. In FIG. 39, a step ST31 obtains vector components e1_x, e1_y, odd_x, odd_y, e2_x and e2_y of the phases at the position regions EVEN1, ODD and EVEN2 by carrying out the following calculations based on the phase information cp1, cp2, sp1 and sp2 read from the register 11. First, even1_cp1+even1_cp2×0.7 is set to e1_x, and even1_sp1+even1_cp2×0.7 is set to e1_y, where cp denotes a x-component of the vector information, and sp denotes a y-component of the vector information. The step ST31 also calculates odd_x, odd_y, e2_x and e2_y by carrying out similar calculations.

A step ST32 multiplies a constant to the previous moving speed of the head 1 and obtains a corrected phase θ. A step ST33 carries out the following vector operations (4) through (6). The steps ST31 through ST33 are essentially the same as the corresponding steps ST21 through ST23 shown in FIG. 38.

$$\begin{pmatrix} e1\_x' \\ e1\_y' \end{pmatrix} = \begin{pmatrix} \cos\theta & -\sin\theta \\ \sin\theta & \cos\theta \end{pmatrix} \begin{pmatrix} e1\_x \\ e1\_y \end{pmatrix} \quad (4)$$

$$\begin{pmatrix} e2\_x' \\ e2\_y' \end{pmatrix} = \begin{pmatrix} \cos\theta & \sin\theta \\ -\sin\theta & \cos\theta \end{pmatrix} \begin{pmatrix} e2\_x \\ e2\_y \end{pmatrix} \quad (5)$$

$$\begin{pmatrix} even\_x \\ even\_y \end{pmatrix} = \begin{pmatrix} e1\_x' & e2\_x' \\ e1\_y' & e2\_y' \end{pmatrix} \quad (6)$$

A step ST34 calculates "pos_deg" from the arc tangent of even_x*odd_x+even_y*odd_y and even_x*odd_y–even_y*odd_x, where "*" denotes a multiplication. In addition, a step ST35 obtains the true position of the head 1 on the disk 100 based on "pos_deg" and the predicted position, and obtains the head moving speed and the predicted position at the next sampling point.

In other words, the following relationships stand from the inner product theorem when making the phase comparison of the vectors of "even" and "odd".

even·odd=|even||odd|cos φ even·odd=even_x*odd_x+even_y*odd_y

When the outer product is taken into consideration, the following basic characteristic can be obtained by defining the outer product in the rightward or clockwise direction, where i, j and k respective indicate unit vectors in the x, y and z directions, and "×" denotes an outer product.

| | | |
|---|---|---|
| i × i = 0 | j × i = −k | k × i = j |
| i × j = k | j × j = 0 | k × j = −i |
| i × k = −j | j × k = i | k × k = 0 |

However, since the original vector is on the xy plane, it may be regarded that the following relationships stand.

| | |
|---|---|
| i × i = 0 | j × i = −k |
| i × j = k | j × j = 0 |

Accordingly, the following relationship can be obtained.

even×odd=even_x+odd_y−even_y*odd_x

In addition, the following relationship can be obtained from the outer product theorem.

even×odd=|even||odd|sin φ

Therefore, the following relationships can be obtained if it is assumed that r=|even||odd|.

sin φ=(even×odd)/r cos φ=(even·odd)/r

Figure 40:
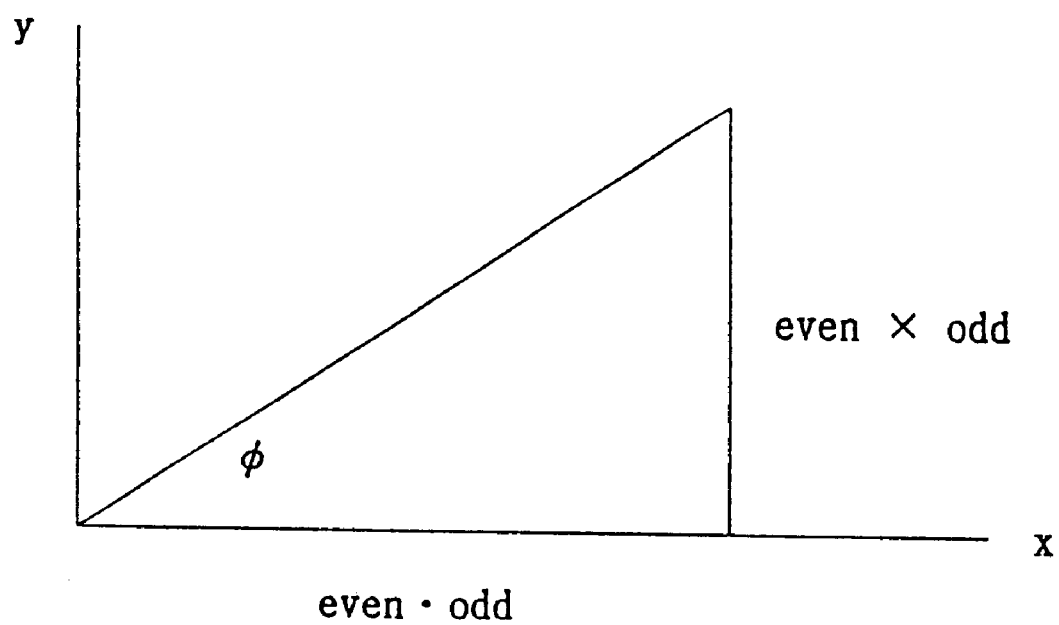
FIG. 40 is a diagram for explaining the phase calculation process shown in FIG. 39.

As a result, φ in the 4 quadrants becomes the phase, and as may be seen from FIG. 40, it is possible to directly calculate the phase of the 2 vectors from φ=arctan2 (outer product, inner product).

According to the phase calculation process shown in FIG. 39, it is possible to correct the phase depending on the seek speed in the vector form without having to convert the vector information into the angle information, and the result of the phase correction with respect to the position regions EVEN1 and EVEN2 can be obtained directly from the vector. In this case, compared to the phase calculation process shown in FIG. 38, it is possible to further reduce the number of calculations of the arc tangent. In addition, in the case of the vector operation, no boundary exists at ±180° as in the case of the operation carried out with respect to the angle, and thus, the conditional decisions can be reduced as compared to the phase conversion process shown in FIG. 35. As a result, the phase calculation process shown in FIG. 39 can further reduce the amount of calculation and calculation time required by the phase calculation process shown in FIG. 38, thereby making it possible to further reduce the load on the MPU 3.

Further, the present invention is not limited to these embodiments, but various variations and modifications may be made without departing from the scope of the present invention.

What is claimed is:

1. A method of detecting a scanning position on a disk which is time-divisionally recorded with a data region and a servo region based on a signal read from the disk according to a phase demodulation technique, a servo mark pattern being recorded in three kinds of position regions EVEN1, ODD and EVEN2 in the servo region with a phase which changes by a fixed quantity for each successively scanned cylinder on the disk but in mutually opposite directions between the position region ODD and the position regions EVEN1 and EVEN2, said method comprising the steps of:

(a) converting a phase of the servo mark pattern in the position regions EVEN1 and EVEN2 into a phase of the servo mark pattern at an approximate center of the position region ODD; and (b) detecting the scanning position on the disk based on the converted phase of the servo mark pattern in the position regions EVEN1 and EVEN2 and the phase of the servo mark pattern in the position region ODD.

2. The method of detecting the position on the disk as claimed in claim 1, wherein said step (a) converts the phase as it is in a vector form.

3. A disk unit for detecting a scanning position on a disk which is time-divisionally recorded with a data region and a servo region based on a signal read from the disk according to a phase demodulation technique, a servo mark pattern being recorded in three kinds of position regions EVEN1, ODD and EVEN2 in the servo region with a phase which changes by a fixed quantity for each successively scanned cylinder on the disk but in mutually opposite directions between the position region ODD and the position regions EVEN1 and EVEN2, said disk unit comprising:

converting means for converting a phase of the servo mark pattern in the position regions EVEN1 and EVEN2 into a phase of the servo mark pattern at an approximate center of the position region ODD; and detecting means for detecting the scanning position on the disk based on the converted phase of the servo mark pattern in the position regions EVEN1 and EVEN2 and the phase of the servo mark pattern in the position region ODD.

4. The disk unit as claimed in claim 3, wherein said converting means converts the phase as it is in a vector form.

* * * * *